United States Patent
Inose et al.

(10) Patent No.: US 9,892,173 B2
(45) Date of Patent: Feb. 13, 2018

(54) INFORMATION PROCESSING APPARATUS, INFORMATION PROCESSING SYSTEM, PROCESSING METHOD THEREOF, AND RECORDING MEDIUM FOR SEARCHING IN A SEARCH FOLDER SET WITH A SEARCH CONDITION

(71) Applicant: CANON KABUSHIKI KAISHA, Tokyo (JP)

(72) Inventors: Tsutomu Inose, Kawasaki (JP); Fumiaki Itoh, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 626 days.

(21) Appl. No.: 14/028,318

(22) Filed: Sep. 16, 2013

(65) Prior Publication Data

US 2014/0019476 A1    Jan. 16, 2014

Related U.S. Application Data

(63) Continuation of application No. 12/269,640, filed on Nov. 12, 2008, now Pat. No. 8,554,810.

(30) Foreign Application Priority Data

Nov. 15, 2007 (JP) .................................. 2007-297203

(51) Int. Cl.
*G06F 17/30* (2006.01)
(52) U.S. Cl.
CPC .. *G06F 17/30554* (2013.01); *G06F 17/30286* (2013.01)
(58) Field of Classification Search
CPC ..... Y10S 707/99933; Y10S 707/99943; Y10S 707/99934; Y10S 707/99935;
(Continued)

(56) References Cited

U.S. PATENT DOCUMENTS 5,628,009 A    5/1997  Kikuta et al.
6,457,017 B2   9/2002  Watkins et al.
(Continued)

FOREIGN PATENT DOCUMENTS

JP    6325094 A      11/1994
JP    2002288016 A   10/2002
(Continued)

OTHER PUBLICATIONS

Jill E. Foust, Phillip Bergen, Gretchen L. Maxeiner and Peter N. Pawlowski "Improving e-book access via a library developed full-text search tool" Jan. 2007, J Med Libr Assoc.
(Continued)

*Primary Examiner* — Polina Peach
(74) *Attorney, Agent, or Firm* — Carter, DeLuca, Farrell & Schmidt, LLP

(57) ABSTRACT

Aspects of invention may allow an operator to recognize that a search corresponding to search conditions set in a search folder does not function when such case occurs. In one embodiment, an information processing apparatus may include a search unit that conducts a search that corresponds to each of one or a plurality of search conditions set in a search folder, and searches for at least one folder element of the search folder. The apparatus also includes a search status confirmation unit that confirms the search status for each search condition in the search unit, and a folder-content display unit (e.g., search folder display unit) that displays, when the search status confirmation unit confirms that the search corresponding to the one or plurality of search conditions set in the search folder does not function, information indicating a malfunction.

13 Claims, 20 Drawing Sheets

(58) Field of Classification Search
CPC ....... Y10S 707/99931; G06F 17/30011; G06F 17/30864; G06F 17/30126; G06F 17/30554; G06F 17/276; G06F 17/301; G06F 17/30286
See application file for complete search history.

(56) References Cited

U.S. PATENT DOCUMENTS

| | | | |
|---|---|---|---|
| 6,587,969 B1* | 7/2003 | Weinberg et al. | 714/46 |
| 7,058,886 B1 | 6/2006 | Sulistio et al. | |
| 7,137,100 B2* | 11/2006 | Iborra | G06F 8/30 |
| | | | 717/104 |
| 7,596,766 B1 | 9/2009 | Sharma et al. | |
| 7,774,322 B2 | 8/2010 | Davis et al. | |
| 7,774,326 B2 | 8/2010 | Arrouye et al. | |
| 7,831,913 B2 | 11/2010 | MacLaurin | |
| 7,860,867 B2* | 12/2010 | Kan et al. | 707/739 |
| 7,917,838 B2* | 3/2011 | Young | G06F 9/4443 |
| | | | 707/821 |
| 7,937,365 B2 | 5/2011 | Prahlad et al. | |
| 8,024,335 B2 | 9/2011 | Anthony et al. | |
| 2002/0057269 A1* | 5/2002 | Barber | G06F 3/0481 |
| | | | 345/418 |
| 2002/0087516 A1* | 7/2002 | Cras | G06F 17/30398 |
| 2004/0001106 A1 | 1/2004 | Deutscher et al. | |
| 2004/0030692 A1 | 2/2004 | Leitermann | |
| 2004/0078358 A1 | 4/2004 | Hughes et al. | |
| 2004/0088412 A1* | 5/2004 | John et al. | 709/226 |
| 2005/0102567 A1 | 5/2005 | McGuire et al. | |
| 2005/0188174 A1 | 8/2005 | Guzak et al. | |
| 2006/0004725 A1 | 1/2006 | Abraido-Fandino | |
| 2006/0047644 A1* | 3/2006 | Bocking | G06F 17/30964 |
| 2006/0053181 A1 | 3/2006 | Anand et al. | |
| 2006/0072354 A1 | 4/2006 | Ohnuma et al. | |
| 2006/0075120 A1 | 4/2006 | Smit | |
| 2006/0112081 A1* | 5/2006 | Qureshi | 707/3 |
| 2006/0224959 A1 | 10/2006 | McGuire et al. | |
| 2006/0235817 A1* | 10/2006 | Wong | G06F 8/60 |
| 2007/0005581 A1 | 1/2007 | Arrouye et al. | |
| 2007/0027858 A1 | 2/2007 | Weinberg et al. | |
| 2007/0180472 A1 | 8/2007 | Denda et al. | |
| 2007/0240071 A1* | 10/2007 | Sherrill | G05B 23/0267 |
| | | | 715/764 |
| 2008/0262860 A1 | 10/2008 | Schneider et al. | |
| 2009/0006543 A1* | 1/2009 | Smit | G06F 17/30864 |
| | | | 709/203 |
| 2009/0164939 A1* | 6/2009 | Ishimitsu | G06F 9/4443 |
| | | | 715/805 |

FOREIGN PATENT DOCUMENTS

| | | |
|---|---|---|
| JP | 2006-155019 A | 6/2006 |
| JP | 2006268323 A | 10/2006 |

OTHER PUBLICATIONS

Japanese Office Action dated Aug. 20, 2012 for copending Japanese Application No. 2007297203.

* cited by examiner

F I G. 4
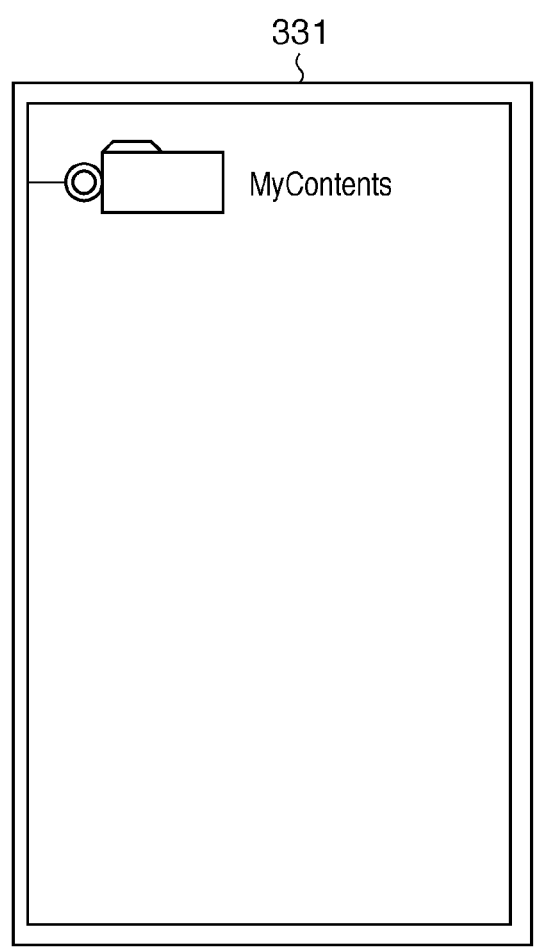

FIG. 5

| 501 | 502 | 503 | 504 | 505 | 506 | 507 |
|---|---|---|---|---|---|---|
| ID | PARENT ID | NAME | TYPE | CONTENT TYPE | REGISTRATION/ CREATION USER | SEARCH CONDITION |
| 1000 | – | MyContents | NORMAL FOLDER | | | |
| 2000 | 1000 | Family | NORMAL FOLDER | | | |
| 4611 | 2000 | 20061231220804.jpg | CONTENT | IMAGE | TARO | |
| 4612 | 2000 | MEMO.txt | CONTENT | DOCUMENT | JIRO | |
| 3000 | 1000 | Tom | NORMAL FOLDER | | | |
| 4711 | 3000 | 20070101094301.jpg | CONTENT | IMAGE | SABURO | |
| 4712 | 3000 | 20070101094422.jpg | CONTENT | IMAGE | SABURO | |
| 4713 | 3000 | MANUAL.doc | CONTENT | DOCUMENT | JIRO | |
| 4000 | 1000 | MUST-SEE | SEARCH FOLDER | | | LOCAL: FULL-TEXT SEARCH: /FIGURE/ |

FIG. 6

| ID (501) | NAME (503) | TYPE (504) | SEARCH CONDITION (507) |
|---|---|---|---|
| 2000 | Family | NORMAL FOLDER | |
| 3000 | Tom | NORMAL FOLDER | |
| 4000 | MUST-SEE | SEARCH FOLDER | LOCAL: FULL-TEXT SEARCH: /FIGURE/ |

322

F I G. 13

| 501 | 502 | 503 | 504 | 505 | 506 | 507 |
|---|---|---|---|---|---|---|
| ID | PARENT ID | NAME | TYPE | CONTENT TYPE | REGIS-TRATION/CREATION USER | SEARCH CONDITION |
| 1000 | — | MyContents | NORMAL FOLDER | | | |
| 2000 | 1000 | Family | NORMAL FOLDER | | | |
| 4611 | 2000 | 20061231220804.jpg | CONTENT | IMAGE | TARO | |
| 4612 | 2000 | MEMO.txt | CONTENT | DOCUMENT | JIRO | |
| 3000 | 1000 | Tom | NORMAL FOLDER | | | |
| 4711 | 3000 | 20070101094301.jpg | CONTENT | IMAGE | SABURO | |
| 4712 | 3000 | 20070101094422.jpg | CONTENT | IMAGE | SABURO | |
| 4713 | 3000 | MANUAL.doc | CONTENT | DOCUMENT | JIRO | |
| 4000 | 1000 | MUST-SEE | SEARCH FOLDER | | | (SECOND INFORMATION PROCESSING APPARATUS: FULL-TEXT SEARCH: /FIGURE/) OR (LOCAL: ATTRIBUTE SEARCH: REGISTRATION/CREATION USER="JIRO") |
| 5000 | 1000 | IMAGE (FOR TARO) | SEARCH FOLDER | | | (LOCAL: ATTRIBUTE SEARCH: CONTENT TYPE ="IMAGE") OR (LOCAL: ATTRIBUTE SEARCH: REGISTRATION/CREATION USER="TARO") |

| ID 501 | NAME 503 | TYPE 504 | SEARCH CONDITION 507 |
|---|---|---|---|
| 2000 | Family | NORMAL FOLDER | |
| 3000 | Tom | NORMAL FOLDER | |
| 4000 | MUST-SEE | SEARCH FOLDER | (SECOND INFORMATION PROCESSING APPARATUS: FULL-TEXT SEARCH: /FIGURE/) OR (LOCAL: ATTRIBUTE SEARCH: REGISTRATION/CREATION USER="JIRO") |
| 5000 | IMAGE (FOR TARO) | SEARCH FOLDER | (LOCAL: ATTRIBUTE SEARCH: CONTENT TYPE ="IMAGE") OR (LOCAL: ATTRIBUTE SEARCH: REGISTRATION/CREATION USER="TARO") |

SECOND INFORMATION PROCESSING APPARATUS: FULL-TEXT SEARCH: ABNORMAL

LOCAL: ATTRIBUTE SEARCH: NORMAL

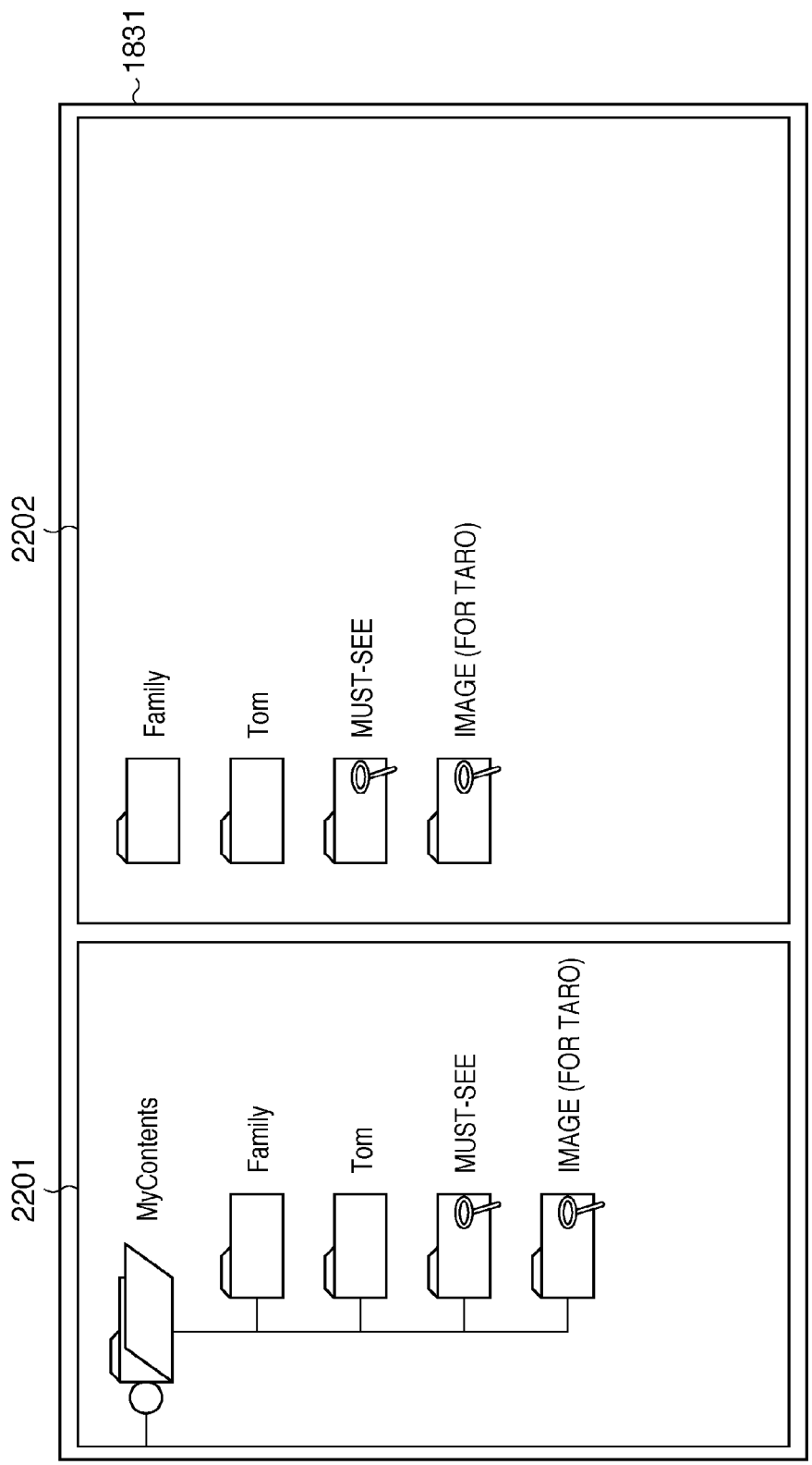

FIG. 20

| 501 | 502 | 503 | 504 | 505 | 506 | 507 |
|---|---|---|---|---|---|---|
| ID | PARENT ID | NAME | TYPE | CONTENT TYPE | REGISTRATION/ CREATION USER | SEARCH CONDITION |
| 1000 | – | MyContents | NORMAL FOLDER | | | |
| 2000 | 1000 | Family | NORMAL FOLDER | | | |
| 4611 | 2000 | 20061231220804.jpg | CONTENT | IMAGE | TARO | |
| 4612 | 2000 | MEMO.txt | CONTENT | DOCUMENT | JIRO | |
| 3000 | 1000 | Tom | NORMAL FOLDER | | | |
| 4711 | 3000 | 20070101094301.jpg | CONTENT | IMAGE | SABURO | |
| 4712 | 3000 | 20070101094422.jpg | CONTENT | IMAGE | SABURO | |
| 4713 | 3000 | MANUAL.doc | CONTENT | DOCUMENT | JIRO | |
| 4000 | 1000 | MUST-SEE | SEARCH FOLDER | | | (LOCAL: FULL-TEXT SEARCH: /FIGURE/) OR (LOCAL: ATTRIBUTE SEARCH: REGISTRATION/CREATION USER="JIRO") |
| 5000 | 1000 | IMAGE (FOR TARO) | SEARCH FOLDER | | | (LOCAL: ATTRIBUTE SEARCH: CONTENT TYPE="IMAGE") OR (LOCAL: ATTRIBUTE SEARCH: REGISTRATION/CREATION USER="TARO") |

FIG. 21

LOCAL: FULL-TEXT SEARCH: NORMAL
LOCAL: ATTRIBUTE SEARCH: ABNORMAL

FIG. 22

| 501 | 502 | 503 | 504 | 505 | 506 |
|---|---|---|---|---|---|
| ID | PARENT ID | NAME | TYPE | CONTENT TYPE | REGISTRATION/ CREATION USER |
| 4713 | 3000 | MANUAL.doc | CONTENT | DOCUMENT | JIRO |

| ORDER | PROPERTY | |
|---|---|---|
| | SEARCH CONDITION | STATUS |
| 1 | LOCAL: FULL-TEXT SEARCH: /FIGURE/ | ○ |
| 2 | LOCAL: ATTRIBUTE SEARCH: REGISTRATION/CREATION USER="JIRO" | × |
| LOCAL FORMULA | 1 or 2 | |

| ORDER | PROPERTY | | |
|---|---|---|---|
| | SEARCH CONDITION | STATUS | RECOVERY METHOD |
| 1 | SECOND INFORMATION PROCESSING APPARATUS: FULL-TEXT SEARCH: /FIGURE/ | × | LAUNCH FULL-TEXT SEARCH PROGRAM IN SECOND INFORMATION PROCESSING APPARATUS |
| 2 | LOCAL: ATTRIBUTE SEARCH: REGISTRATION/CREATION USER="JIRO" | ○ | |
| LOCAL FORMULA | 1 or 2 | | |

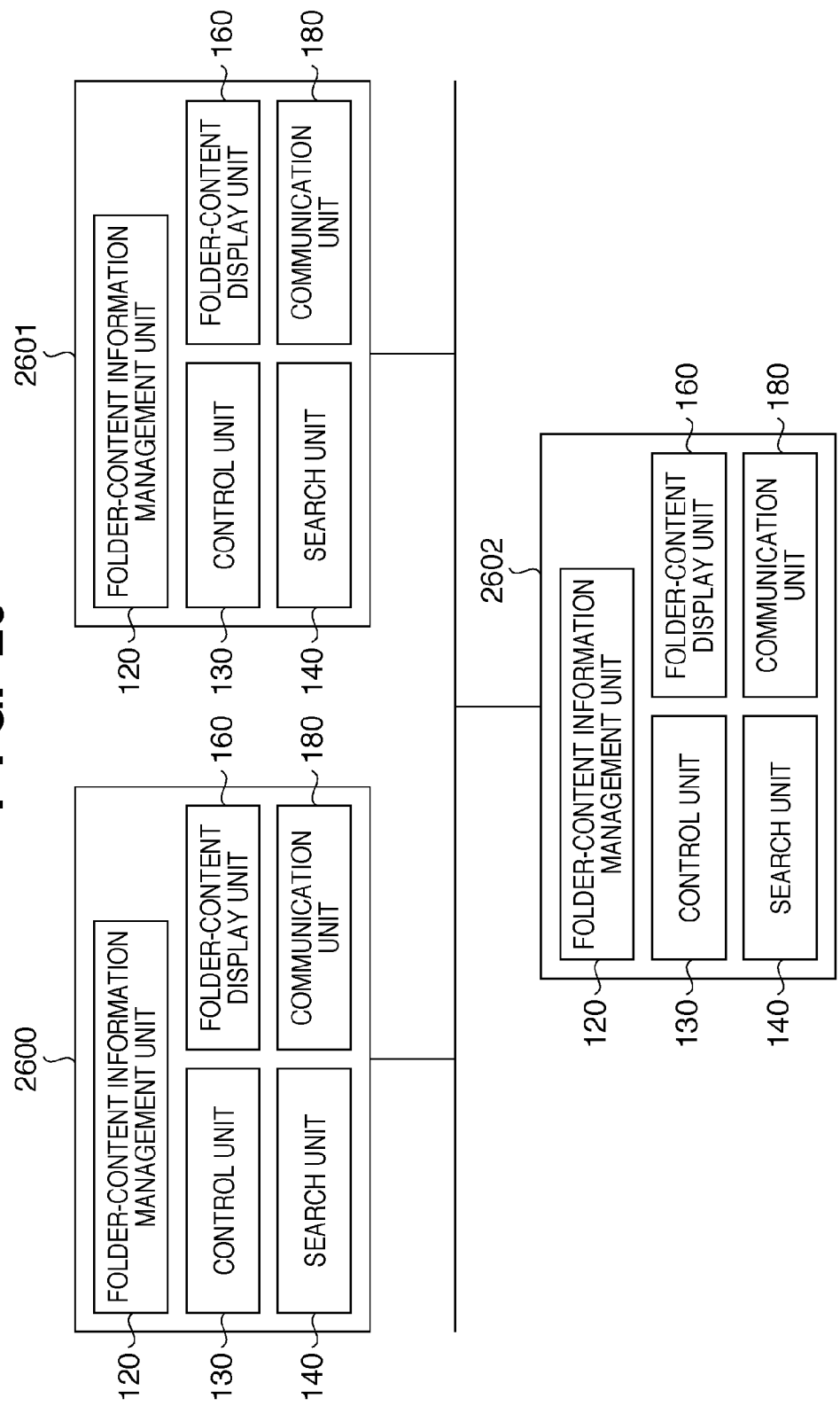

INFORMATION PROCESSING APPARATUS, INFORMATION PROCESSING SYSTEM, PROCESSING METHOD THEREOF, AND RECORDING MEDIUM FOR SEARCHING IN A SEARCH FOLDER SET WITH A SEARCH CONDITION

CROSS REFERENCE TO RELATED APPLICATIONS

This application is a continuation of U.S. patent application Ser. No. 12/269,640, filed Nov. 12, 2008, which claims priority from Japanese Patent Application No. 2007-297203 filed Nov. 15, 2007, the disclosures of each of which are hereby incorporated by reference herein in their entirety.

BACKGROUND OF THE INVENTION

Field of the Invention

The present invention generally relates to at least one of an information processing apparatus, information processing system, processing method thereof, and recording medium, which are configured to handle a search folder set with a search condition.

Description of the Related Art

Folders set with a search condition (to be referred to as a search folder hereinafter) are conventionally known. When the search folder is opened, a search for data that match the search condition is conducted, and data that match the search condition are displayed as folder elements of the search folder (see Japanese Patent Laid-Open No. 2006-155019).

However, with the conventional search folder, it may be the case that the operator cannot recognize whether or not a search corresponding to the set search condition is functioning, and the operator may often become confused.

Such a situation may occur in a search folder that combines a plurality of search methods, for example, in a search folder in which a search using a full-text search and attribute search is set, when a search using one of these methods does not function. For example, when an attribute search functions, but a full-text search does not function because full-text search index construction is underway, data that match the attribute search condition are displayed as folder elements even though the full-text search has not been done. For this reason, the operator who opened the search folder may mistakenly believe that data retrieved by both of the two search functions are displayed, since data retrieved by the attribute search are displayed, even though the full-text search has not be done.

The above situation may also occur in the case of a search folder that combines a search on a local apparatus with that on an apparatus via a network. Two pattern examples as configurations of the apparatuses and search methods in such a case will be explained below. In the first configuration, different searches are conducted on respective apparatuses. For example, an attribute search is conducted on a local apparatus, and a full-text search is conducted on an apparatus connected via a network. In the second configuration, a plurality of apparatuses have a data management function and search function, and a search is conducted over these plurality of apparatuses.

In these configurations, a search set in a search folder may not normally function in those cases where, for example, the power supply of the apparatus connected via the network is OFF, the apparatus is offline, the processing load on that apparatus is heavy and the apparatus cannot return a response within a prescribed time period, and so forth. When some of searches in the search folder do not actually take place for these reasons, data based on the search that does normally function are nonetheless displayed as folder elements of the search folder, and the operator may be thus be misled.

SUMMARY OF THE INVENTION

In one embodiment, the present invention provides a technique that allows the operator to recognize when a search corresponding to search conditions set for a search folder is not functioning.

According to a first aspect of the present invention, there is provided an information processing apparatus including a search unit configured to conduct a search that corresponds to each of one or a plurality of search conditions set in a search folder, and searches for at least one folder element of the search folder. The apparatus also includes a confirmation unit configured to confirm a search status for each search condition in the search unit, and a display unit configured to display, when the confirmation unit confirms that the search corresponding to the one or plurality of search conditions set in the search folder does not function, information indicating that a malfunction has occurred.

According to a second aspect of the present invention, there is provided an information processing system including a first information processing apparatus that displays a search corresponding to each of one or a plurality of search conditions set in a search folder, and a second information processing apparatus that is connected to the first information processing apparatus via a communication unit. The second information processing apparatus includes a reception unit configured to receive a request of the search that is transmitted from the first information processing apparatus via the communication unit, and is based on each of the one or plurality of search conditions set in the search folder and a second search unit configured to conduct the search based on the request received by the reception unit. The first information processing apparatus includes a first search unit configured to conduct the search that corresponds to each of the one or plurality of search conditions set in the search folder and searches for at least one folder element of the search folder. The first information processing apparatus also includes a confirmation unit configured to confirm a search status of the search for respective search conditions in the first search unit and the second search unit, and a display unit configured to display, when the confirmation unit confirms that the search corresponding to the one or plurality of search conditions set in the search folder does not function, information indicating that a malfunction has occurred.

Further features of the present invention will become apparent from the following description of exemplary embodiments with reference to the attached drawings.

BRIEF DESCRIPTION OF THE DRAWINGS

FIG. 4 is a view showing an example of a screen layout of a folder disclosure operation screen according to the first embodiment;

FIG. 5 is a table showing an example of the configuration of folder-content information according to the first embodiment;

FIG. 6 is a table showing an example of the configuration of a folder information list according to the first embodiment;

FIG. 13 is a table showing an example of the configuration of folder-content information according to the second embodiment;

FIG. 14 is a table showing an example of a folder information list according to the second embodiment;

FIG. 15 is a view showing an example of the configuration of search status information according to the second embodiment;

FIG. 19 is a view showing an example of a screen layout of a search folder element disclosure operation screen;

FIG. 20 is a table showing an example of the configuration of folder-content information according to the third embodiment;

FIG. 21 is a view showing an example of the configuration of search status information according to the third embodiment;

FIG. 22 is a table showing an example of the configuration of folder element information according to the third embodiment;

FIG. 24 is a view showing an example of a property screen that shows the property of a "must-see" folder in a folder tree display area 2201 shown in FIG. 23;

FIG. 25 is a view showing an example of a property screen that shows the property of a "must-see" folder shown in FIG. 16; and FIG. 26 is a block diagram showing an example of the overall arrangement according to a sixth embodiment.

DESCRIPTION OF THE EMBODIMENTS

Aspects of the present invention will now be described in detail with reference to the drawings. It should be noted that the relative arrangement of the components, the numerical expressions and numerical values set forth in these embodiments do not limit the scope of the present invention unless it is specifically stated otherwise.

In embodiments to be described hereinafter, a "search folder" indicates a folder in which one or a plurality of search conditions are set, and a "folder" or "normal folder" indicates a folder other than the search folder.

A first embodiment will exemplify a case in which a list display of folders which include a search folder are managed in a self (e.g., local) apparatus.

An example of the functional arrangement in an information processing apparatus 100 according to the first embodiment will be described below with reference to FIG. 1. Note that embodiments of the present invention may be implemented by a single information processing apparatus or by distributing respective functions to a plurality of information processing apparatuses. Upon implementation using a plurality of apparatuses, the respective apparatuses are connected via a communication unit (for example, a network such as a LAN (Local Area Network) or the like) to communicate with each other. Note that the communication unit may be implemented using, for example, a USB (Universal Serial Bus) or the like as long as it allows mutual communications.

The information processing apparatus 100 may have a function for displaying contents and folders, a function for displaying whether or not a search or searches corresponding to one or a plurality of search functions set in a search folder functions or whether they function upon displaying the search folder, and the like.

Figure 1:
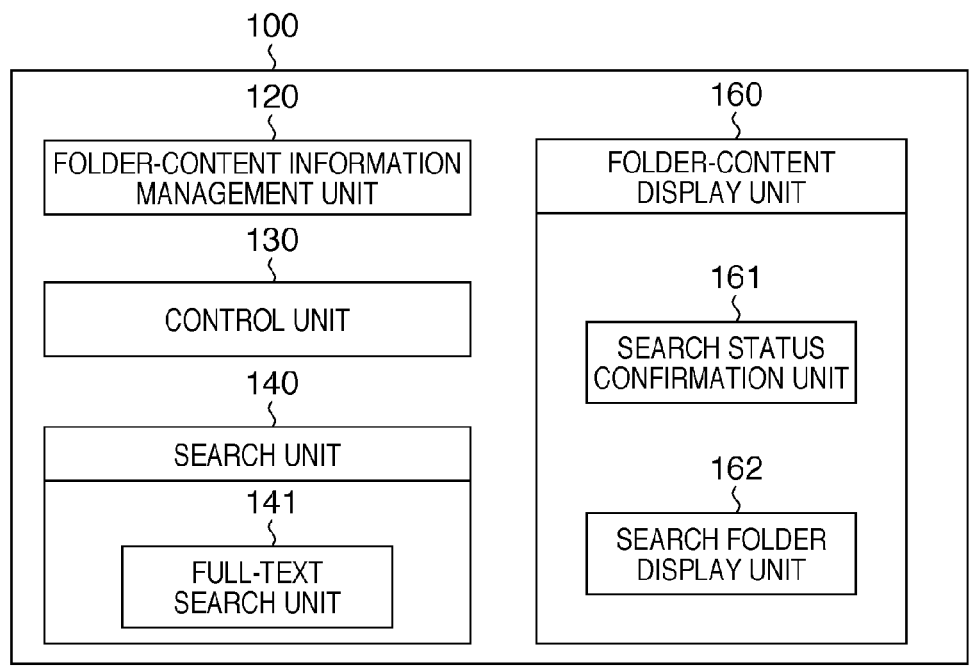
FIG. 1 is a block diagram showing an example of the functional arrangement in an information processing apparatus 100 according to a first embodiment.

Note that, in the embodiment as illustrated in FIG. 1, the information processing apparatus 100 comprises a folder-content information management unit 120, control unit 130, search unit 140, and folder-content display unit 160 as functional units.

The folder-content information management unit 120 manages folder-content information, and updates or provides that information in response to a request. The folder-content information may indicate folders and contents, and their structure information and attribute information. In the case of a search folder, search conditions and the like may be further held therein. Note that the structure information may indicate a structure indicating which folder each of the folders and contents belongs. The attribute information can hold the attribute values of a registration/creation user and the like.

The control unit 130 systematically controls the processing in the information processing apparatus 100. That is, various processing functions configured on the information processing apparatus 100 may operate according to instructions from the control unit 130.

The search unit 140 conducts a search or searches corresponding to one or a plurality of search conditions set in the search folder. The search unit 140 conducts the search or searches corresponding to the one or plurality of search conditions, and may return a search result for a search that is normally completed. By contrast, the search unit 140 may return an indication of malfunction or abnormality for a search that is not normally completed. The search unit 140 comprises a full-text search unit 141 that conducts a full-text search. The full-text search unit 141 may be cable of holding full-text search index data, and conducting a full-text search based on the index data.

The folder-content display unit 160 displays folders and contents based on, e.g., the folder-content information and the like that is managed by the folder-content information management unit 120. The folder-content display unit 160 comprises a search status confirmation unit 161 and search folder display unit 162. The search status confirmation unit 161 confirms whether or not a search corresponding to a search condition set in a search folder is functioning upon displaying the search folder. When there is a plurality of search conditions, the unit 161 confirms for each search condition if a search is functioning. The search folder display unit 162 displays the search folder and the like based on the confirmation result.

Figure 2:
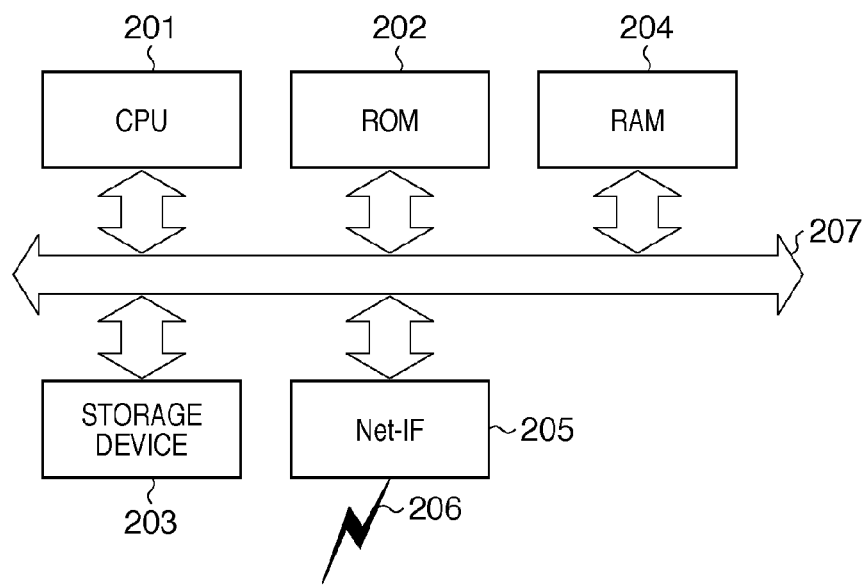
FIG. 2 is a block diagram showing an example of the hardware arrangement in the information processing apparatus 100 shown in FIG. 1.

FIG. 2 is a block diagram showing an example of a hardware arrangement suitable for the information processing apparatus 100 corresponding to that described using FIG. 1.

Reference numeral 201 denotes a CPU (Central Processing Unit), which controls respective devices connected to a CPU bus 207 based on programs (for example, an information processing program) stored in a ROM 202 and storage device 203. Reference numeral 202 denotes a ROM (Read Only Memory) that holds various control programs and data. Reference numeral 204 denotes a RAM (Random Access Memory) that has a work area of the CPU 201, a data save area at the time of error processing, a load area of control programs, and the like. Reference numeral 203 denotes a storage device that stores various control programs and various data. Reference numeral 205 denotes a Net-IF that allows communications with other information processing apparatuses and the like via a network 206. Reference numeral 207 denotes a CPU bus that may include at least one of an address bus, data bus, and control bus. Control programs may be provided to the CPU 201 from the ROM 202 and storage device 203 and also from another information processing apparatus or the like via the network 206.

Figure 3:
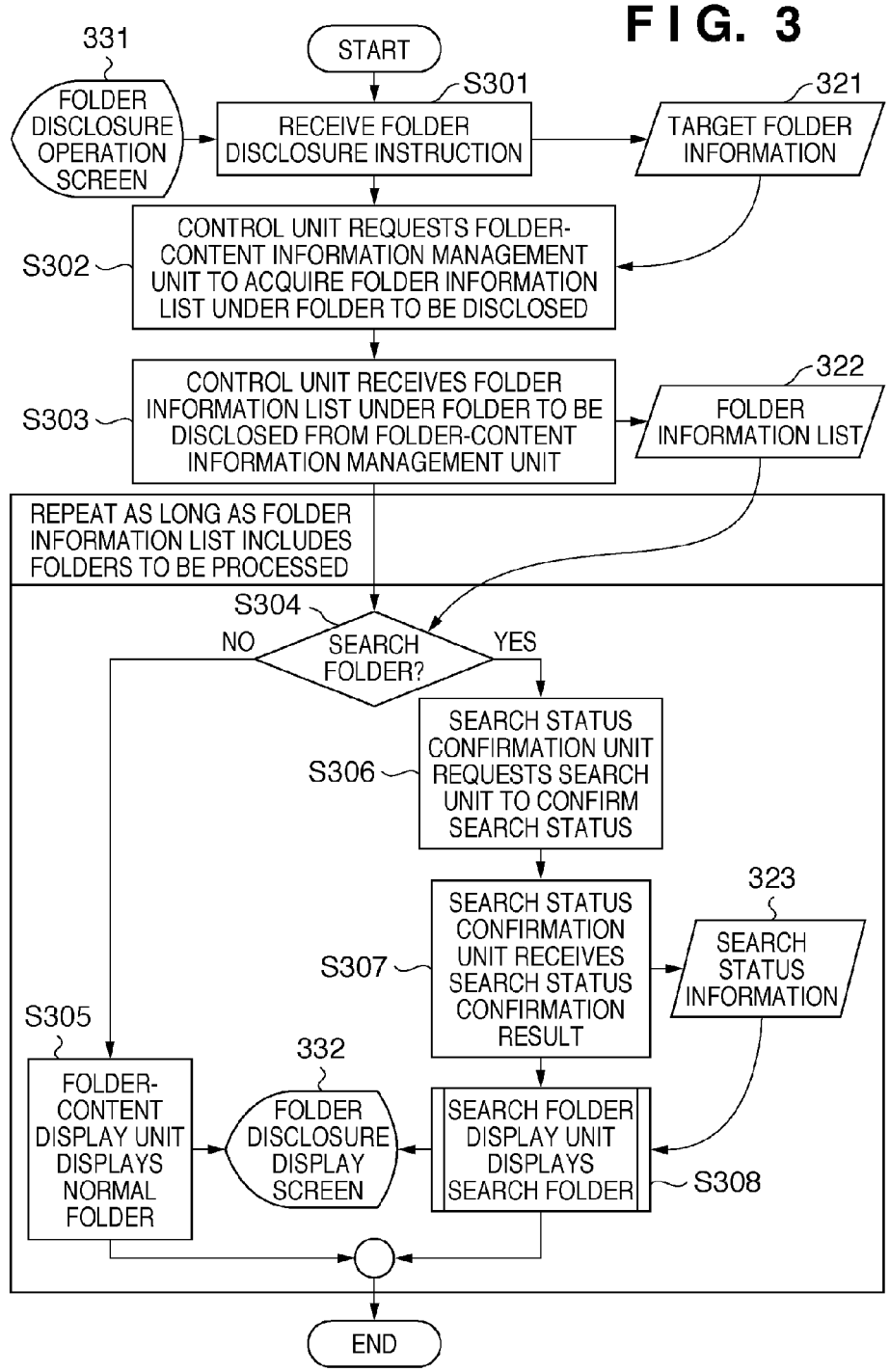
FIG. 3 is an example of a flowchart for displaying a list of folders in the information processing apparatus 100 shown in FIGS. 1 and 2.

FIG. 3 is an example of a flowchart for displaying a list of folders in the information processing apparatus 100 shown in FIGS. 1 and 2.

Prior to the start of this processing, the information processing apparatus 100 displays a folder disclosure operation screen 331. An example of a folder disclosure operation screen will be described below with reference to FIG. 4.

The folder disclosure operation screen 331 displays a folder hierarchical tree. In this case, "MyContents" is displayed. A double circle is displayed on the left side surface of a "MyContents" folder icon. In this embodiment, the double circle displayed on the left side surface of a folder icon indicates that folders exist under that folder, and the folder is not opened. When the operator instructs to disclose "MyContents" in the folder disclosure operation screen 331, the processing of the flowchart shown in FIG. 3 is started.

Referring back to FIG. 3, upon receipt of a disclosure instruction of the "MyContents" folder from the folder disclosure operation screen 331 in step S301, the control unit 130 outputs information of the folder to be disclosed as target folder information 321 to, for example, the RAM 204 or the like. The target folder information holds folder information of a target folder to be disclosed, that is, the "MyContents" folder.

In step S302, the control unit 130 requests the folder-content information management unit 120 to acquire a folder information list based on the target folder information. Note that the folder information list based on the target folder information is acquired from the folder-content information managed by the folder-content information management unit 120. A practical example of the folder-content information according to the first embodiment will be described below with reference to FIG. 5.

FIG. 5 shows folder-content information of a sub-tree having "MyContents" as an uppermost folder. Reference numeral 501 denotes an ID. That is, the ID 501 is unique identification information used to identify each of folders and contents managed in the information processing apparatus 100. Reference numeral 502 denotes a parent ID. The parent ID 502 indicates an upper structure of each of the folders and contents, that is, a parent folder. Reference numeral 503 denotes a name of each of the folders and contents. Reference numeral 504 denotes a type. In this case, a folder which is normally used and holds a static parent-child relationship is described as a "normal folder". Also, a folder to which search conditions are linked, and which displays, as at least one folder element, folders and contents that match the search conditions is described as a "search folder". Note that "content" indicates an image file, text file, or the like.

Reference numeral 505 denotes a content type. The content type 505 may be one of attributes, which holds a type such as "document", "image", or the like. Reference numeral 506 denotes a registration/creation user. That is, the registration/creation user 506 is one of attributes, which holds a registration or creation user of the content. Reference numeral 507 denotes a search condition, which holds a value only when the type 504 is "search folder". In the search condition of this embodiment, a search target apparatus, search method, and condition (in this case, a search character string) are delimited using colons, that is, ":" as delimiters, and a search term in a full-text search is bounded by "/".

For example, in a "must-see" folder with an ID=4000, a character string "Local: full-text search: /figure/" is described as a search condition. This search condition indicates that the apparatus as a search target is "Local", that is, the self apparatus, the search method is a full-text search, and a search character string is "figure". With this search condition, a full-text search of a term "figure" is conducted in the self apparatus.

FIG. 5 shows nine data. For example, in this case, data with an ID=1000 is the uppermost folder of a sub-tree. Having the folder with the ID=1000 as a parent are a normal folder with an ID=2000, a normal folder with an ID=3000, and a search folder with an ID=4000. Furthermore, having the folder with the ID=2000 as a parent are a jpeg file with an ID=4611 and a txt file with an ID=4612 exist. Having the folder with the ID=3000 as a parent are a jpeg file with an ID=4711, a jpeg file with an ID=4712, and a doc file with an ID=4713 exist.

Referring back to FIG. 3, after the process advances to step S303, the control unit 130 receives the folder information list under the disclosure target folder from the folder-content information management unit 120, and outputs the received list as a folder information list 322 to, for example, the RAM 204 or the like. An example of a folder information list 322 will be described below with reference to FIG. 6. Note that reference numerals 501, 503, 504, and 507 in FIG. 6 denote the same items as in FIG. 5 described above, and thus a repetitive description thereof is being avoided. In this case, the folder information list 322 includes, as data, only information of folders which have "MyContents" as their parent folder, as shown in FIG. 6. For this reason, three folders, that is, the normal folder with the ID=2000, the normal folder with the ID=3000, and the search folder with the ID=4000 are listed.

Referring back to FIG. 3, after the folder information list 322 is output, the information processing apparatus 100 repetitively executes the processes in steps S304 and S305, or those in steps S304 and S306 to S308, in correspondence with the number of folders included in the folder information list 322. In this repetitive processing, the control unit 130 checks in step S304 if the first folder in the output folder information list 322 is a normal folder or search folder. As described above in the example using FIG. 6, since the first folder is a normal folder with the ID=2000 (NO in step S304), the process advances to step S305, and the folder-content display unit 160 displays an icon of a normal folder on a folder disclosure display screen 332. Since the second folder is also a normal folder with the ID=3000 (NO in step S304), the same processing as in the first folder is repeated. Since the third folder is a search folder with the ID=4000, the control unit 130 determines in step S304 that the folder of interest is a search folder (YES in step S304), and the process advances to step S306.

In step S306, the search status confirmation unit 161 requests the search unit 140 to confirm a search status. Note that a search unit as a request destination may vary depending on the search condition set in the search folder. In this case, since the search condition of the search folder "must-see" with the ID=4000 is set with "Local", the search status confirmation unit 161 requests the search unit 140 of the self apparatus to confirm the status of the search method in the search condition, that is, the full-text search.

Since the search method in this example is the full-text search, the search unit 140 that received the request checks if the full-text search unit 141 managed by itself is functioning, and returns that result to the search status confirmation unit 161. Upon receipt of the search status in step S307, the search status confirmation unit 161 outputs that status as search status information 323 to, for example, the RAM 204 or the like. It may be assumed in this embodiment that the full-text search function does not function since full-text search index construction is underway. Therefore, the search unit 140 returns a search status indicating "abnormal," i.e. a malfunction, to the search status confirmation unit 161. Note that a practical example of the search status information 323 will be described later.

After the search status information 323 is output, the process advances to step S308, and the information processing apparatus 100 controls the search folder display unit 162 to display an icon of the search folder according to the search status information 323 on the folder disclosure display screen 332.

The processing in step S308 in FIG. 3 will be described in detail below with reference to the embodiment illustrated in FIG. 7.

Figure 8:
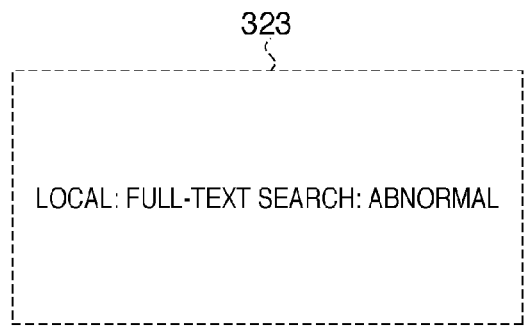
FIG. 8 is a view showing an example of the configuration of search status information according to the first embodiment.

Upon receipt of the search status information 323, the search status confirmation unit 161 checks in step S401 based on the search status information 323 if a search is normally completed. FIG. 8 shows a practical example of the received search status information 323.

The search status information 323 shown in FIG. 8 describes a character string "Local: full-text search: abnormal". In this case, this information indicates that an abnormality has occurred upon execution of the full-text search in the apparatus "Local" as a search target, that is, in the self apparatus.

Referring back to FIG. 7, if the search status confirmation unit 161 determines in step S401 with reference to the search status information 323 that the search is normally completed (YES in step S401), the process advances to step S402, and the search folder display unit 162 displays an icon of the search folder on the folder disclosure display screen 332.

On the other hand, if the search status confirmation unit 161 determines in step S401 that the search is abnormal (NO in step S401), the process advances to step S403, and the search folder display unit 162 displays an icon of the search folder, which indicates "abnormal", on the folder disclosure display screen 332. Note that the search status information 323 shown in FIG. 8 is obtained in this example by confirming the search folder with the ID=4000 (see FIG. 6). Therefore, upon displaying an icon of the search folder with the ID=4000, an icon indicating "abnormal" is displayed.

Figure 7:
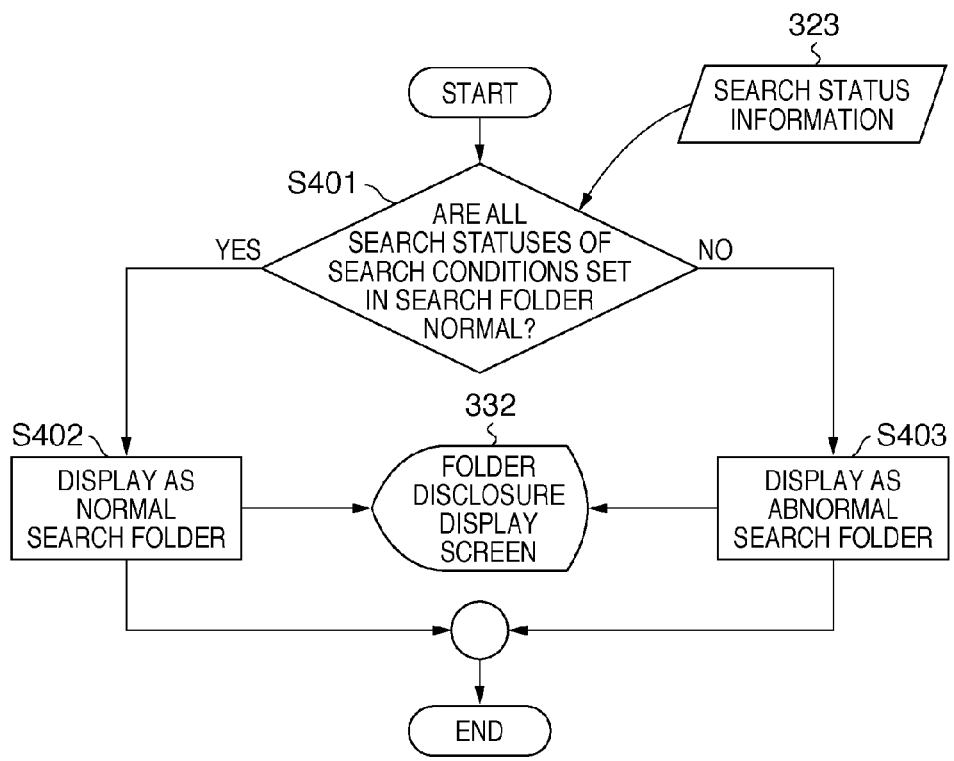
FIG. 7 is an example of a flowchart showing details of the processing in step S308 shown in FIG. 3.
Figure 9:
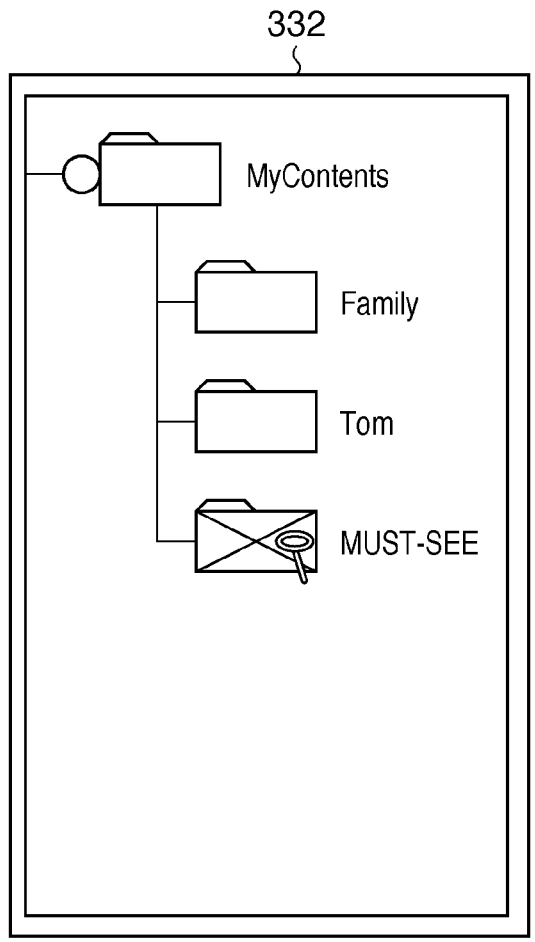
FIG. 9 is a view showing an example of a screen layout of a folder disclosure display screen according to the first embodiment.

FIG. 9 shows an example of the screen layout of the folder disclosure display screen 332 displayed in the processes shown in FIGS. 3 and 7 according to the first embodiment.

The folder disclosure display screen 332 displays the folder hierarchical tree after disclosure of "MyContents". Under "MyContents", normal folders "Family" and "Tom" are displayed by the processing in step S305 in FIG. 3. Furthermore, a search folder "must-see" is displayed. On the icon of the search folder, "magnifying glass (double circle+ bar)" indicating the search folder is displayed. Also, since the aforementioned search status information 323 shown in FIG. 8 indicates "abnormal", in this embodiment a "x" mark is displayed by drawing diagonal lines on the folder icon.

In the aforementioned processing in FIG. 3, the search statuses of all search folders of folders included in the folder list information 322 are confirmed. However, the processing may also be modified, so that status confirmation of an identical search function to a single search unit is done only one time. For example, the confirmation result of a search status for a certain search folder may be diverted to confirmation of a search status of another search folder.

The processing in FIG. 3 has been explained in this example under the assumption that the full-text search does not function since full-text search index construction is underway. Of course, the full-text search function may not function for reasons other than the above reason. For example, the full-text search index data may be damaged, or the full-text search unit 141 may break down.

As described above, according to the first embodiment, the operator can recognize that an abnormality has occurred in the search corresponding to the search condition set in the search folder.

In the above description, the time for clearing of the "x" mark displayed on the search folder icon when an abnormality has occurred in the search is not mentioned. However, the time for clearing is not particularly limited. For example, when the disclosure instruction of the list display of folders is issued again, the "x" mark may be cleared at a time at which the search is normally completed. Alternatively, the search may be conducted as needed during display of the "x" mark, and the "x" mark may be cleared when that search is normally completed.

A second embodiment exemplifies a case of making a list display of folders including a search folder in which search conditions over a plurality of apparatuses are set in the arrangement in which a plurality of apparatuses each having a search function are connected to a network. That is, the second embodiment will explain a case of making a list display of folders including a search folder in which search conditions for conducting searches using search units (for example, first and second search units) equipped in different apparatuses are set.

Figure 10:
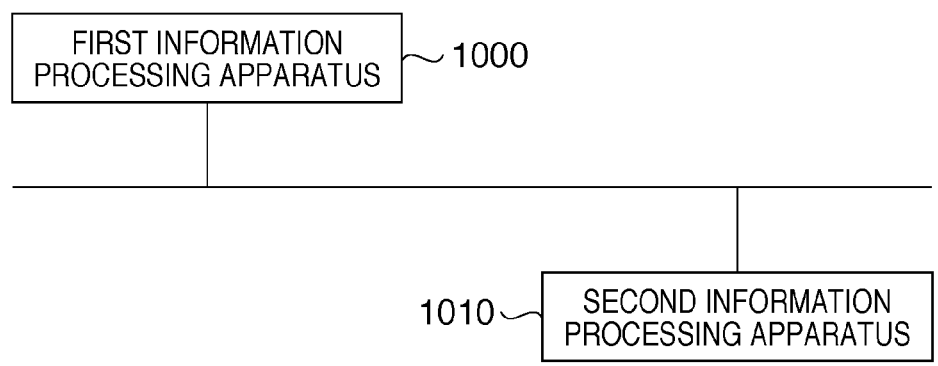
FIG. 10 is a diagram showing an overall arrangement according to a second embodiment.

FIG. 10 is a diagram showing an example of the overall arrangement according to the second embodiment. In FIG. 10, a first information processing apparatus 1000 having an attribute search function and a second information processing apparatus 1010 having a full-text search function are connected via a network.

Figure 11:
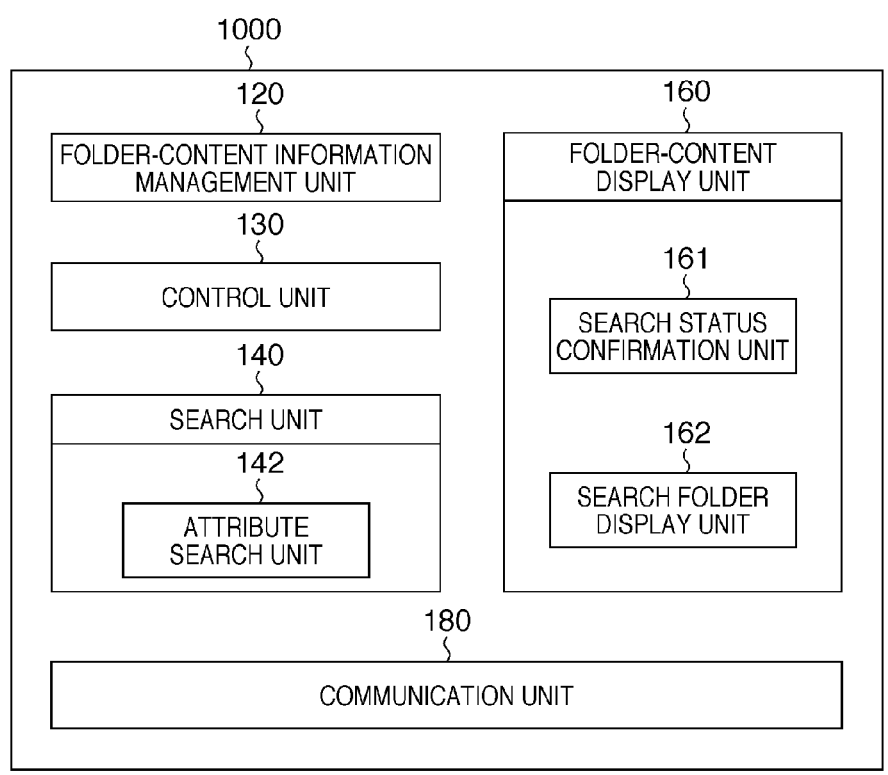
FIG. 11 is a block diagram showing an example of the functional arrangement in a first information processing apparatus 1000 shown in FIG. 10.

FIG. 11 is a block diagram showing an example of the functional arrangement of the first information processing apparatus 1000 shown in FIG. 10. The first information processing apparatus 1000 may be the same or similar to the information processing apparatus 100 shown in FIG. 1 in the first embodiment, and thus the same reference numerals in FIG. 11 denote the same components as in FIG. 1 that attain nearly the same operations. Accordingly, the description below will mainly focus on differences from the information processing apparatus 100 shown in FIG. 1.

In this embodiment, the first information processing apparatus 1000 comprises a communication unit 180. In the search unit 140, the full-text search unit 141 is excluded, and an attribute search unit 142 is newly added. The communication unit 180 may be used to transmit a search status confirmation request from the search status confirmation unit 161 to a search unit of another apparatus. Also, the communication unit 180 may be used to receive a search status response from another apparatus which received the confirmation request. The attribute search unit 142 conducts an attribute search.

Figure 12:
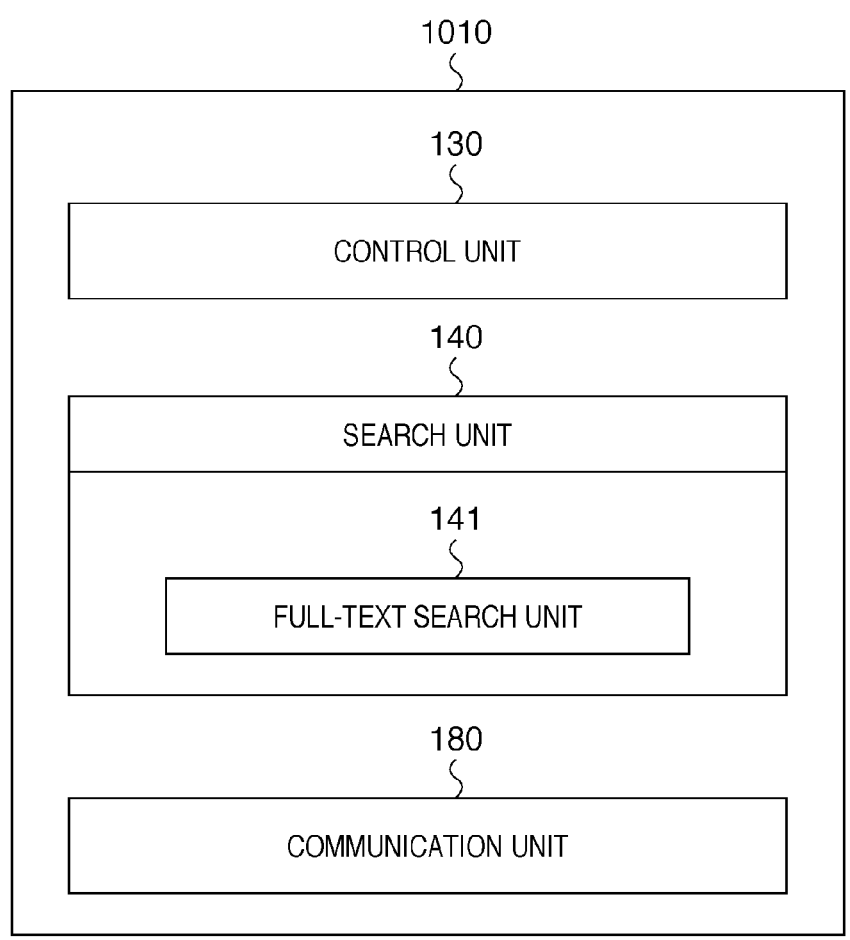
FIG. 12 is a block diagram showing an example of the functional arrangement in a second information processing apparatus 1010 shown in FIG. 10.

FIG. 12 is a block diagram showing an example of the functional arrangement of the second information processing apparatus 1010 shown in FIG. 10.

The second information processing apparatus 1010 may be the same or similar to the information processing apparatus 100 shown in FIG. 1 of the first embodiment, and thus the same reference numerals in FIG. 12 denote the same components as in FIG. 1 that attain nearly the same operations. Accordingly, the description below will mainly focus on differences from the information processing apparatus 100 shown in FIG. 1.

In this embodiment, in the second information processing apparatus 1010, the folder-content information management unit 120 and folder-content display unit 160 are excluded, and a communication unit 180 is newly added. The second information processing apparatus 1010 receives a full-text search request and a status confirmation request of a full-text search unit, and transmits a response based on that status confirmation request via a network using the communication unit 180.

Processing for displaying a list of folders using the search functions implemented in the plurality of apparatuses will be described below. Note that the processing in the second embodiment may be essentially the same or similar as that in the first embodiment, and thus will be described using the flowchart of FIG. 3.

Prior to the start of this processing, the first information processing apparatus 1000 displays a folder disclosure operation screen 331. Note that the folder disclosure operation screen 331 may have the same configuration as that shown in FIG. 4 of the first embodiment. When the operator gives the instruction to disclose "MyContents" in the folder disclosure operation screen 331, the processing of the flowchart shown in FIG. 3 is started.

Upon receipt of a disclosure instruction of the "MyContents" folder from the folder disclosure operation screen 331 in step S301, the control unit 130 outputs information of the folder to be disclosed as target folder information 321 to, for example, the RAM 204 or the like. As described above, the target folder information holds folder information of a target to be disclosed, that is, the "MyContents" folder.

Processing advances to step S302, where the control unit 130 requests the folder-content information management unit 120 to acquire a folder information list based on the target folder information. A practical example of folder-content information according to the second embodiment will be described below with reference to FIG. 13. Note that reference numerals 501 to 507 in FIG. 13 denote the same items as those in FIG. 5 in the first embodiment, and thus a repetitive description thereof is being avoided.

In this example, a "must-see" folder with an ID=4000, a character string "(second information processing apparatus: full-text search: /figure/) or (local: attribute search: registration/creation user="Jiro")" is described as a search condition. This search condition indicates the logical sum of the following two conditions. The first condition indicates that an apparatus as a search target is the second information processing apparatus 1010, the search method is a full-text search, and a term "figure" is included. The second condition indicates that an apparatus as a search target is the self apparatus, the search method is an attribute search, and the registration/creation user is "Jiro". In FIG. 13, the apparatus as a search target is designated using an apparatus name "second information processing apparatus" and a name "local", but other kinds of information may be used instead as long as they can uniquely identify apparatuses on the network. For example, a host name, IP address, and the like may be used.

In an "image (for Taro)" folder with an ID=5000, a character string "(local: attribute search: content type="image") or (local: attribute search: registration/creation user="Taro")" is described as a search condition. This search condition indicates the logical sum of the following two conditions. The first condition indicates that an apparatus as a search target is the self apparatus, the search method is an attribute search, and the content type is "image". The second condition indicates that an apparatus as a search target is the self apparatus, the search method is an attribute search, and the registration/creation user is "Taro". In FIG. 13, 10 data exist. That is, the search folder with the ID=5000 exists in addition to FIG. 5.

Referring back to FIG. 3, after the process advances to step S303, the control unit 130 receives the folder information list under the disclosure target folder from the folder-content information management unit 120, and outputs the received list as a folder information list 322 to, for example, the RAM 204 or the like. An example of the folder information list 322 will be described below with reference to FIG. 14. In this case, the folder information list 322 includes, as data, only information of folders which have "MyContents" as their parent folder, as shown in FIG. 14. In FIG. 14, four folders, that is, a normal folder with an ID=2000, a normal folder with an ID=3000, the search folder with the ID=4000, and the search folder with the ID=5000 are listed.

Referring back to FIG. 3, after the folder information list 322 is output, the first information processing apparatus 1000 repetitively executes the processes in steps S304 and S305, or those in steps S304 and S306 to S308, in correspondence with the number of folders included in the folder information list 322, which is output in step S303. In this repetitive processing, the control unit 130 checks in step S304 if the first folder in the output folder information list 322 is a normal folder or search folder. As described above using FIG. 14, since the first and second folders are normal folders with the IDs=2000 and 3000 (NO in step S304), the process advances to step S305, and the folder-content display unit 160 displays icons of the normal folders on a folder disclosure display screen 332. Since the third folder is a search folder with the ID=4000, the control unit 130 determines that the folder of interest is a search folder (YES in step S304), and the process advances to step S306.

In step S306, the search status confirmation unit 161 requests the search unit 140 to confirm a search status. Note that if the search condition includes a condition indicating that the apparatus as a search target is another apparatus, the unit 161 transmits a request to a search unit of that apparatus via the communication unit 180. As described above, in the search folder with the ID=4000 in this example, the condition for conducting an attribute search on the self apparatus and that for conducting a full-text search on the second information processing apparatus 1010 are set.

In this case, the search status confirmation unit 161 requests the search unit 140 of the self apparatus to confirm the status about the former search, that is, the attribute search on the self apparatus. Upon receipt of the request, since the search method is the attribute search, the search unit 140 determines if the attribute search unit 142 managed by itself is functioning. The determined search status is returned to the search status confirmation unit 161.

Upon receipt of the search status in step S307, the search status confirmation unit 161 outputs that status as search status information 323 to, for example, the RAM 204 or the like. It is assumed that in this embodiment, the attribute search unit 142 of the first information processing apparatus 1000 functions. Therefore, the search unit 140 returns a search status indicating "normal" to the search status confirmation unit 161. Note that a practical example of the search status information 323 will be explained later.

Subsequently, the search status confirmation unit 161 confirms a search status about the latter search, that is, a full-text search by the second information processing apparatus 1010 using the communication unit 180. In this case, since the apparatus as a search target is the second information processing apparatus 1010, the search status confirmation unit 161 transmits a status confirmation request from the communication unit 180 of the first information processing apparatus 1000 to the communication unit 180 of the second information processing apparatus 1010 via the network. Upon receipt of this request, the communication unit 180 of the second information processing apparatus 1010 passes that request to the search unit 140 of the second information processing apparatus 1010. Then, the search unit 140 of the second information processing apparatus 1010 determines whether or not the full-text search unit 141 that manages itself is functioning. The determined search status is transmitted from the communication unit 180 of the second information processing apparatus 1010 to the communication unit 180 of the first information processing apparatus 1000, and is returned to the search status confirmation unit 161 of the first information processing apparatus 1000. It is assumed that in this embodiment, the full-text search unit 141 of the second information processing apparatus 1010 does not function due to breakdown. In this case, a search status indicating "abnormal" is returned. A practical example of the search status information 323 will be described later.

After the search status information 323 is output, the process advances to step S308, and the first information processing apparatus 1000 controls the search folder display unit 162 to display an icon of each search folder according to the search status information 323 on the folder disclosure display screen 332.

When the apparatus as a search target is only the self apparatus like the search folder with the ID=5000 as in the present example, the need for a request to the second information processing apparatus 1010 via the communication unit 180 can be obviated. In the second embodiment as well, status confirmation of an identical search function to a single search unit may be done only one time, as in the first embodiment described above. In such a case, the search status confirmed based on the search condition of the search folder with the ID=4000 can be re-used intact in the search folder with the ID=5000.

The processing in step S308 in FIG. 3 will be described in detail below. Note that the processing in the second embodiment may be essentially the same or similar as that in the first embodiment, and thus will be described with reference to FIG. 7.

Upon receipt of the search status information 323, the search status confirmation unit 161 checks in step S401 based on the search status information 323 if searches are normally completed. FIG. 15 shows a practical example of the received search status information 323.

The search status information 323 shown in FIG. 15 describes character strings "second information processing apparatus: full-text search: abnormal" and "Local: attribute search: normal". The search status information 323 shown in FIG. 15 indicates the statuses of searches corresponding to the search conditions set in the search folders with the IDs=4000 and 5000 in FIG. 13. In this case, the information indicates that an abnormality has occurred upon execution of the full-text search on the second information processing apparatus 1010, and execution of the attribute search on its own apparatus has been normally completed. Therefore, since this information indicates that the full-text search on the second information processing apparatus 1010 based on the search condition set in the search folder with the ID=4000 is abnormal, an icon indicating "abnormal" is displayed as that of the search folder with the ID=4000. Also, since the attribute search on its own apparatus is normal, an icon indicating "normal" is displayed as that of the search folder with the ID=5000.

Figure 16:
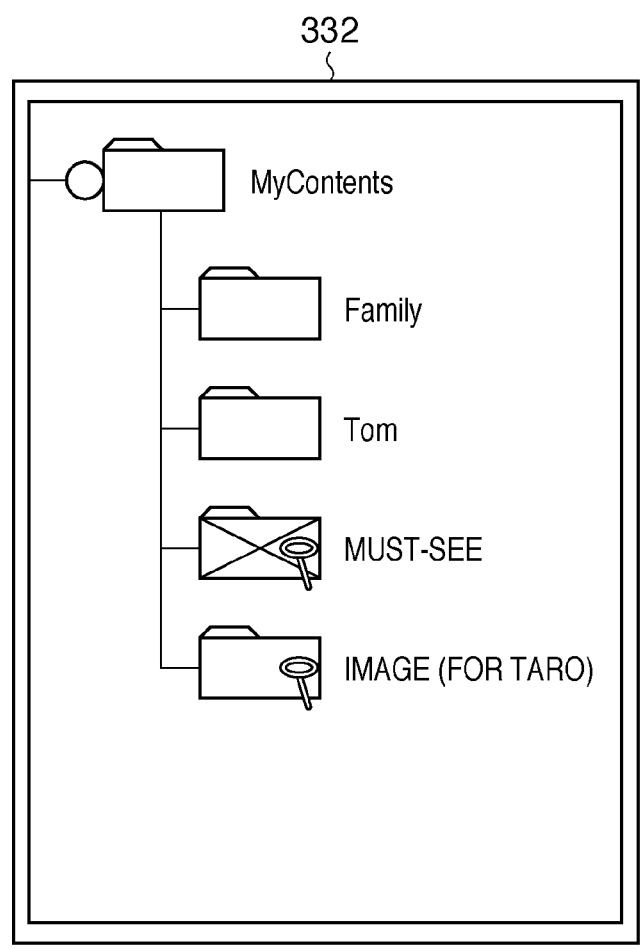
FIG. 16 is a view showing an example of a screen layout of a folder disclosure display screen according to the second embodiment.

FIG. 16 shows an example of the screen layout of the folder disclosure display screen 332 displayed in the processes shown in FIGS. 3 and 7 according to the second embodiment.

The folder disclosure display screen 332 displays the folder hierarchical tree after disclosure of "MyContents". Under "MyContents", normal folders "Family" and "Tom" are displayed by the processing in step S305 in FIG. 3. Furthermore, search folders "must-see" and "image (for Taro)" are displayed under "MyContents" by the processing in step S308 in FIG. 3.

On the icon of the "must-see" search folder, "magnifying glass (double circle+bar)" indicating the search folder is displayed. Also, since the aforementioned search status information 323 shown in FIG. 15 indicates an abnormality, a "x" mark is displayed by drawing diagonal lines on the folder icon. On the icon of the "image (for Taro)" search folder, "magnifying glass (double circle+bar)" indicating the search folder is displayed. In case of "image (for Taro)", since the aforementioned search status information 323 shown in FIG. 15 does not indicate any abnormality, no "x" mark is displayed.

In the second embodiment, the full-text search unit 141 in the second information processing apparatus 1010 does not function due to breakdown. Of course, the full-text search may not function due to reasons other than the above reason. For example, full-text search index data may be damaged, or the full-text search unit 141 may break down, as described in the first embodiment. In addition, any of the communication units 180 and search units 140 in the first and second information processing apparatuses 1000 and 1010 may break down, thus disabling the search functions. Furthermore, the search function may not function due to an abnormality of a network line, an abnormality of a network connection device, power OFF of the second information processing apparatus 1010, offline of that apparatus from the network, and so forth.

As described above, according to the second embodiment, even when an abnormality has occurred in a search by the search folder in which the search conditions over a plurality of apparatuses are set in an environment in which the plurality of apparatuses having search functions are connected to the network, the operator may be able to recognize that abnormality.

In the above description, the time for clearing of the "x" mark displayed on the search folder icon when an abnormality has occurred in the search is not mentioned. However, the time for clearing is not particularly limited as in the first embodiment.

The third embodiment will exemplify a case in which an apparatus having a plurality of search functions displays folder elements of a search folder.

Figure 17:
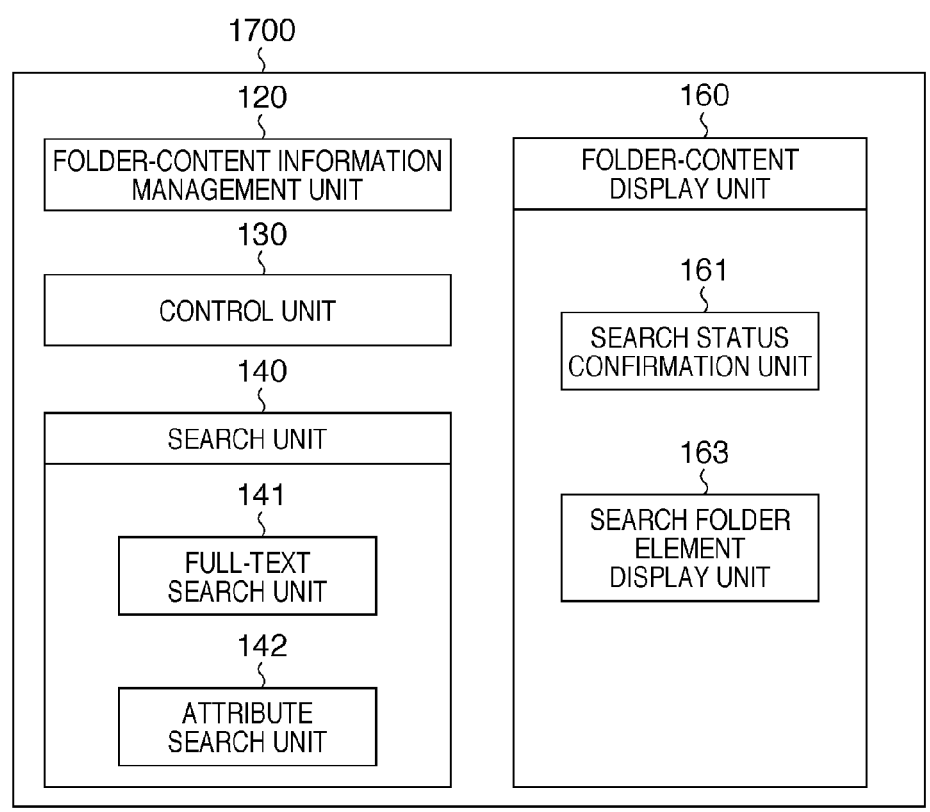
FIG. 17 is a block diagram showing an example of the functional arrangement in an information processing apparatus 1700 according to a third embodiment.

FIG. 17 is a block diagram showing an example of the functional arrangement of an information processing apparatus 1700 according to the third embodiment. The information processing apparatus 1700 may be essentially the same or similar as the information processing apparatus 100 shown in FIG. 1 in the first embodiment, and thus the same reference numerals in FIG. 17 denote the same components as in FIG. 1 that attain nearly the same operations. Thus, the description below will mainly focus on differences from the information processing apparatus 100 shown in FIG. 1.

The information processing apparatus 1700 displays folder elements of a search which is normally completed upon displaying folder elements of a search folder. At the same time, when the search condition includes an apparatus as a search target or a search function, which does not normally function, the apparatus 1700 displays a warning message. For example, the apparatus 1700 displays a message indicating that since not all searches in the search condition of the search folder are normally completed, folder elements which are not displayed may exist.

In this embodiment, the search unit 140 of the information processing apparatus 1700 includes an attribute search unit 142. In the folder-content display unit 160, the search folder display unit 162 is excluded, and a search folder element display unit 163. Since the information processing apparatus 1700 comprises the full-text search unit 141 and attribute search unit 142 in the search unit 140, it can conduct both a full-text search and attribute search.

The search folder element display unit 163 functions to display folder elements of a search folder. Simultaneously with that display, when the search condition set in that search folder includes a search which is not normally completed, the unit 163 displays a warning message that advises accordingly.

Figure 18:
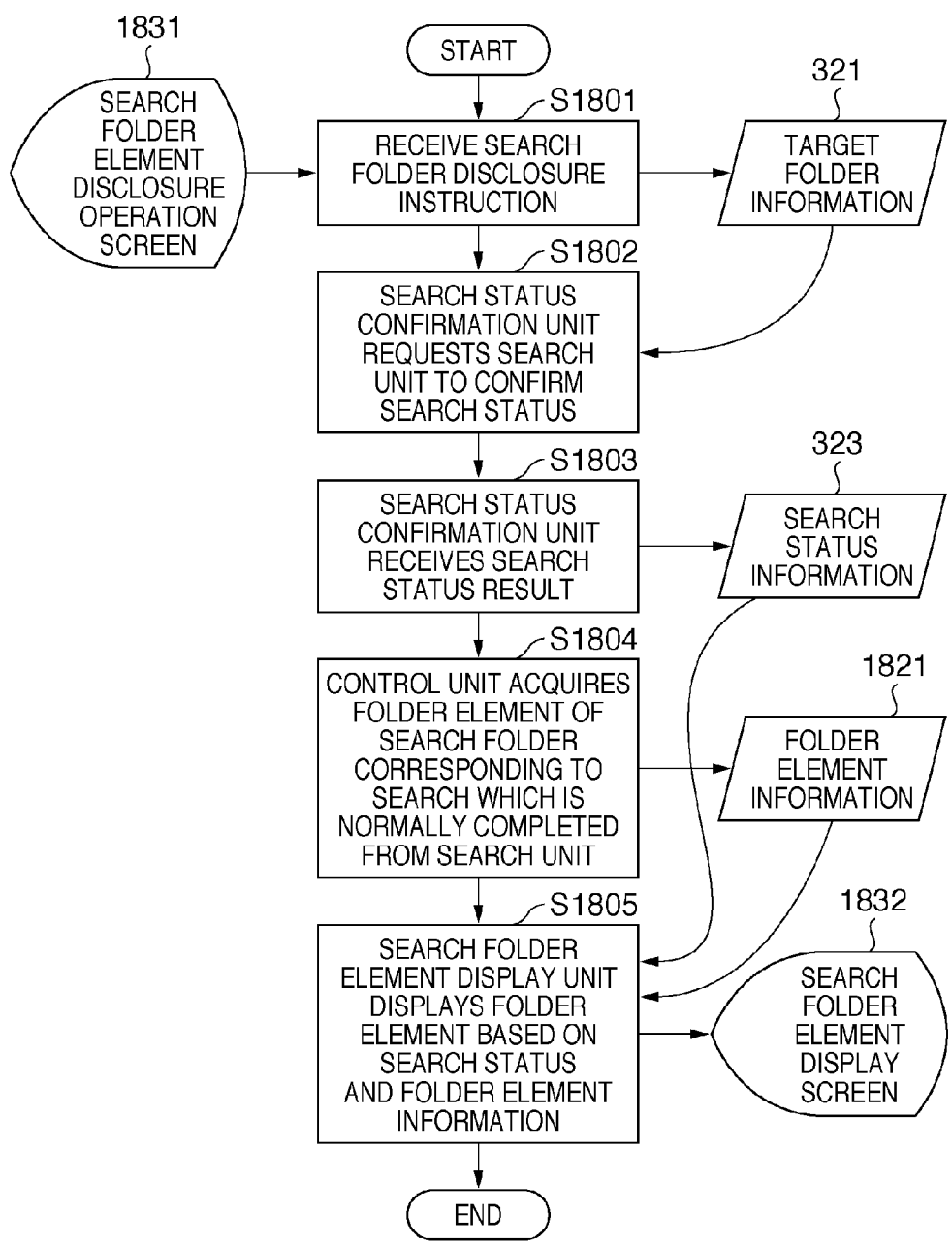
FIG. 18 is an embodiment of a flowchart for displaying folder elements of a search folder in the information processing apparatus 1700 according to the third embodiment.

The processing upon displaying folder elements of a search folder in the information processing apparatus 1700 according to the third embodiment will be described below with reference to FIG. 18.

Prior to the start of this processing, the information processing apparatus 1700 displays a search folder element disclosure operation screen 1831. An example of the search folder element disclosure operation screen 1831 will be described below with reference to FIG. 19.

The search folder element disclosure operation screen 1831 displays a folder hierarchical tree. In FIG. 19, a folder having a sub-tree (in this case, "MyContents") of those managed by the information processing apparatus 1700 is displayed. A folder tree display area 2201 displays "MyContents" as an uppermost folder in a disclosed state of that folder. That is, the area 2201 displays "Family" and "Tom" folders as normal folders and "must-see" and "image (for Taro)" folders as search folders under that folder.

A folder element display area 2202 displays folder elements of a folder disclosed on the folder tree display area 2201. That is, when the disclosed folder is a normal folder, the area 2202 displays folders and contents to have the disclosed folder as a parent folder. When the disclosed folder is a search folder, the area 2202 displays folders and contents that match the search condition set in the search folder.

The folder element display area 2202 indicates a state after the disclosure operation of "MyContents" on the folder tree display area 2201, and displays the "Family", "Tom", "must-see", and "image (for Taro)" folders. When the operator instructs to disclose the "must-see" folder on the folder tree display area 2201, the processing in the flowchart shown in FIG. 18 is started.

Referring back to FIG. 18, upon receipt of a disclosure instruction of the "must-see" folder from the search folder element disclosure operation screen 1831 in step S1801, the control unit 130 outputs information of the folder to be disclosed as target folder information 321 to, for example, the RAM 204 or the like. As described above, the target folder information holds folder information of a target to be disclosed, that is, in this example, the "must-see" folder. A practical example of folder-content information according to the third embodiment will be described below with reference to FIG. 20. Note that the folder-content information shown in FIG. 20 is substantially the same as that shown in FIG. 13 in the second embodiment, except for the search condition for a search folder "must-see" with an ID=4000.

The search condition set in the search folder "must-see" with the ID=4000 in FIG. 20 is "(local: full-text search: /figure/) or (local: attribute search: registration/creation user="Jiro")". This search condition indicates the logical sum of the following two conditions. The first condition indicates that the apparatus as a search target is its own apparatus, the search method is a full-text search, and a term "figure" is included. The second condition indicates that the apparatus as a search target is its own apparatus, the search method is an attribute search, and the registration/creation user is "Jiro".

Referring back to FIG. 18, after the process advances to step S1802, the search status confirmation unit 161 requests the search unit 140 to confirm search statuses corresponding to the search condition. In this case, since the search condition in the search folder "must-see" with the ID=4000 in FIG. 20 is set with the self apparatus as the apparatus serving as a search target, the unit 161 requests the search unit 140 of the self apparatus. Upon requesting, since the search condition in the search folder "must-see" with the ID=4000 in FIG. 20 is set with both the full-text search and attribute search, the unit 161 requests confirmation of both the search functions.

Upon receiving the request, the search unit 140 confirms the search statuses of the full-text search and attribute search. That is, the unit 140 determines whether or not the full-text search unit 141 and attribute search unit 142 that manages itself is functioning normally. The determined search statuses are returned to the search status confirmation unit 161. In step S1803, the search status confirmation unit 161 receives the returned search statuses, and outputs them as search status information 323 to, for example, the RAM 204 or the like. It is assumed that in this embodiment, the full-text search unit 141 normally functions, but the attribute search unit 142 does not normally function due to a failure of a database used. That is, the search status confirmation unit 161 receives the search status information 323 indicating that the full-text search is normal and the attribute search is abnormal. FIG. 21 shows a practical example of the received search status information 323.

The search status information 323 shown in FIG. 21 describes character strings "Local: full-text search: normal" and "Local: attribute search: abnormal". The search status information 323 shown in FIG. 21 indicates a state in which the full-text search conducted by the self apparatus as that serving as a search target is normal, and the attribute search conducted by its own apparatus as that serving as a search target is abnormal.

Referring back to FIG. 18, in step S1804 the control unit 130 acquires folder elements of the search, which is normally completed, of the search folder. In this case, since the full-text search normally functions, the control unit 130 requests the search unit 140 to conduct a search "(local: full-text search: /figure/)", and receives the search result. Then, the control unit 130 outputs the search result as folder element information 1821 to, for example, the RAM 204 or the like. FIG. 22 shows a practical example of the folder element information 1821.

The folder element information 1821 shown in FIG. 22 indicates "manual.doc" with an ID=4713. This is because only the "manual.doc" with the ID=4713 is a content having a term "figure" as text in the folder-content information shown in FIG. 20.

Figure 23:
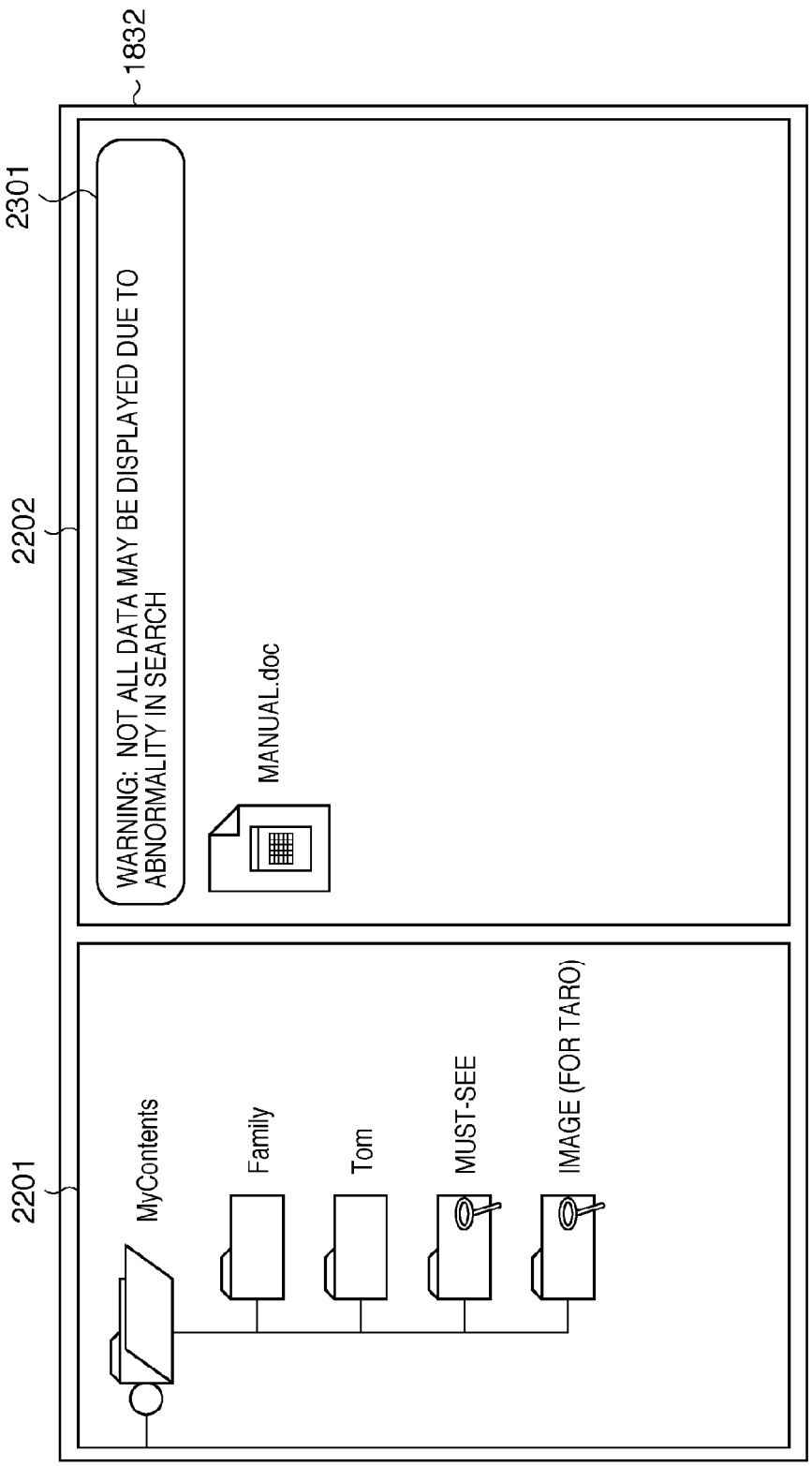
FIG. 23 is a view showing an example of a screen layout of a search folder element display screen.

Referring back to FIG. 18, after the process advances to step S1805, the search folder element display unit 163 displays a search folder element display screen 1832 based on the search status information 323 shown in FIG. 21 and the folder element information 1821 shown in FIG. 22. FIG. 23 shows a practical example of the search folder element display screen 1832.

The search folder element display screen 1832 shown in FIG. 23 shows a display mode after the disclosure operation of the "must-see" folder is done. The folder tree display area 2201 in this example displays essentially the same contents as in FIG. 19, except that the "must-see" folder is opened.

The folder element display area 2202 in this embodiment displays a folder element of the search folder "must-see". That is, a display is made based on the folder element information 1821 shown in FIG. 22. Furthermore, the folder element display area 2202 displays a warning message 2301. This message 2301 is displayed since the search status information 323 shown in FIG. 21 indicates an abnormality in the attribute search.

In the third embodiment, the attribute search does not function due to a failure in a database used by the attribute search unit 142. Of course, the attribute search may not function for reasons other than the above reason. For example, the attribute search may not function because data used by the database are damaged.

As described above, according to the third embodiment, upon displaying folder elements of a search folder, when an abnormality has occurred in a search corresponding to the search condition set in that search folder, the operator can recognize that abnormality.

The fourth embodiment will exemplify a case in which a property display is made of a search condition that is not normally functioning from amongst the search conditions set in a search folder. For the sake of simplicity, it is assumed that the arrangement, other processes, and statuses in the fourth embodiment are the same as or similar to those in the third embodiment.

FIG. 24 is a view showing an example of a property screen indicating the property of the "must-see" folder in the folder tree display area 2201 shown in FIG. 23 in the third embodiment.

In FIG. 24, a property screen 2400 displays the statuses of search conditions indicating whether a corresponding search is abnormal or normal, in addition to the search condition set in the "must-see" folder. In the aforementioned third embodiment, since the full-text search normally functions but the attribute search is abnormal, the status of "local: full-text search: /figure/" is "○" (normal). By contrast, since the status of "local: attribute search: registration/creation user="Jiro"" is "x" (abnormal), a display indicating that abnormality is made.

As described above, according to the fourth embodiment, the information processing apparatus can inform, via the property screen, the operator of which searches corresponding to the search conditions set in the search folder are conducted normally or abnormally.

In the above description, the display timing of the property screen 2400 is not mentioned. This screen may be displayed based on, for example, an instruction from the operator. For example, the operator can set a mouse cursor on a search folder, the property of which he or she wants to refer to, and clicks, for example, a right mouse button, thereby displaying the property screen 2400.

The fifth embodiment will exemplify a case in which a recovery method of a search condition, which is not normally functioning, and which is held by a search folder, is displayed. For the sake of simplicity, it is assumed that the arrangement, other processes, and statuses in the fifth embodiment are the essentially same as those in the second embodiment.

FIG. 25 is a view showing an example of a property screen indicating the property of the "must-see" folder shown in FIG. 16 in the second embodiment.

In FIG. 25, a property screen 2500 displays the statuses of search conditions indicating whether a corresponding search is abnormal or normal, in addition to the search condition set in the "must-see" folder. In the aforementioned second embodiment, since the full-text search function does not normally function due to its breakdown in the second information processing apparatus 1010, its recovery method may require normal function of the full-text search function in the second information processing apparatus 1010.

For this purpose, as the recovery method of "second information processing apparatus: full-text search: /figure/" on the property screen 2500 shown in FIG. 25, a recovery method indicating that "launch a full-text search program in the second information processing apparatus" is presented. When a communication between the first information processing apparatuses 1000 and the second information processing apparatus 1010 itself suffers a problem, a recovery method indicating that "start up the second information processing apparatus or confirm connection to the network" is presented.

As described above, according to the fifth embodiment, the information processing apparatus can confirm which searches corresponding to the search conditions set in the search folder are conducted normally or abnormally, and can inform the operator of that recovery method.

In the above description, the display timing of the property screen 2500 is not mentioned. This screen may be displayed based on, for example, an instruction from the operator. For example, the operator may set a mouse cursor on a search folder, the property of which he or she wants to refer to, and clicks, for example, a right mouse button, thereby displaying the property screen 2500.

The sixth embodiment will exemplify a case in which each of a plurality of apparatuses comprises a folder-content information management unit, search unit, and communication unit, and a search is conducted over this plurality of apparatuses.

FIG. 26 is a block diagram showing an example of the overall arrangement according to the sixth embodiment.

Reference numeral 2600 denotes an information processing apparatus, which has essentially the same arrangement as that of the second information processing apparatus 1010 in the aforementioned second embodiment. In the version as shown, the second information processing apparatus 1010 in the second embodiment has a full-text search function, but it does not comprise a folder-content information management unit 120 and does not hold data unique to the apparatus. By contrast, in the version of the sixth embodiment as shown, each of apparatuses 1 (2601) and 2 (2602) holds data, and has a search unit for the data held by its own apparatus. The information processing apparatus 2600 can designate any or all of its own apparatus, apparatus 1, and apparatus 2 in the search condition of a search folder.

In this arrangement as well, when a search on an apparatus as a search destination designated by the search condition set in a search holder is abnormal, a message that advises accordingly can be displayed.

As described above, according to the sixth embodiment, even when an abnormality has occurred in a search by the search folder set with the search conditions over a plurality of apparatuses in an environment in which the plurality of apparatuses each having a search condition and data to be searched are connected to the network, the operator can recognize that abnormality.

The typical embodiments of the present invention have been explained using the first to sixth embodiments. However, the present invention is not limited to the aforementioned and illustrated embodiments, and appropriate modifications may be made without departing from the scope of the invention.

For example, in the above description, the embodiments that notify the operator of an abnormality upon displaying a list of folders including a search folder, and those that notify the operator of an abnormality upon displaying folder elements of a search folder, have been independently explained. However, these embodiments may also be combined. That is, the first and second embodiments may be combined, for example with the third embodiment.

In the above description, when the operator is informed of an abnormality upon displaying a list of folders including a search folder, a "x" mark is displayed by drawing diagonal lines on a folder icon (first and second embodiments). However, the method of informing of an abnormality (i.e. a malfunction) is not limited to this. For example, an abnormality can be informed by methods of attaching a "warning" mark to a folder icon, changing the color of a folder icon, changing the format of a folder name, and so forth. In the third embodiment, when the operator is informed of an abnormality upon displaying search folder elements, a warning message is displayed. In this case as well, the operator may be informed of an abnormality by other methods. For example, an abnormality can be informed by methods of displaying a warning dialog, changing a background color, and so forth upon disclosing a folder. Likewise, the display method of the search statuses in the fourth embodiment and that of the recovery method in the fifth embodiment are not limited to the above description, and other methods may be used instead.

In the above description, the full-text search and attribute search are used as the search methods. However, the present invention is not limited to only these specific search methods. For example, the same processing can be applied to a similar image search for searching for similar images based on images, a similar document search for searching for similar documents based on text and documents, and the like.

Note that, in one embodiment, the present invention includes a case wherein the functions of the aforementioned embodiments are achieved when a software program is directly or remotely supplied to a system or apparatus, and a computer incorporated in that system or apparatus reads out and executes the instructions in the supplied program code. The program to be supplied in this case is a computer program that implements processing corresponding to the illustrated flowcharts in the embodiments.

Therefore, in one version, the program code itself installed in a computer to implement the functional processing of the present invention using the computer may be capable of implementing aspects of the present invention. That is, embodiments of the present invention may include the computer program itself for implementing the functional processing of the present invention. In this case, the form of program is not particularly limited, and an object code, a program to be executed by an interpreter, script data to be supplied to an OS (Operating System), and the like may be used as long as they are capable of providing instructing for performing the functions of the program.

As a computer-readable storage medium for supplying the computer program, the following media can be used. For example, a Floppy® disk, hard disk, optical disk, magneto-optical disk, MO, CD-ROM, CD-R, CD-RW, magnetic tape, nonvolatile memory card, ROM, DVD (DVD-ROM, DVD-R), and the like can be used.

As another version of a program supply method, the user may establish a connection to a homepage on the Internet using a browser on a client computer, and download the computer program of the present invention from the homepage onto a recording medium such as a hard disk or the like. In this case, the program to be downloaded may be a compressed file including an automatic installation function. Also, in another version, program codes that form the program of the present invention may be segmented into a plurality of files, which may be downloaded from different homepages. That is, the present invention can include a WWW server that makes a plurality of users download program files that may be used to implement the functional processing of the present invention on their computers.

Also, in another version, a storage medium such as a CD-ROM or the like, which stores the encrypted program of the present invention, may be delivered to the user. In this case, the user who has cleared a predetermined condition may be allowed to download key information used to decrypt the encrypted program from a homepage via the Internet. The user executes the encrypted program using that key information to install the program in a computer.

In one version, the functions of the aforementioned embodiments can be implemented when the computer executes the readout program. In addition, the functions of the aforementioned embodiments may also be implemented in collaboration with an OS or the like running on the computer based on an instruction of that program. In this case, the OS or the like executes some or all of actual processes, which implement the functions of the aforementioned embodiments.

Furthermore, in another version, some or all of the functions of the aforementioned embodiments may be implemented when the program read out from the storage medium is written in a memory equipped on a function expansion board or a function expansion unit, which is inserted into or connected to the computer. In this case, after the program is written in the function expansion board or unit, a CPU or the like equipped on the function expansion board or unit may execute some or all of actual processes based on an instruction of that program.

According to the present invention, when at least one of the searches corresponding to search conditions set in a search folder does not function, the operator can recognize that malfunction.

While the present invention has been described with reference to exemplary embodiments, it is to be understood that the invention is not limited to only the specifically disclosed exemplary embodiments. The scope of the following claims is thus to be accorded the broadest interpretation so as to encompass all such modifications and equivalent structures and functions.

What is claimed is:

1. An information processing apparatus comprising one or more processors configured to function as:
    a search engine configured to search for a file contained in a search folder, wherein one or a plurality of search conditions are set in the search folder, and wherein at least one of the one or the plurality of search conditions specifies whether or not searching for text described in the file is functioning;
    a confirmation unit configured to confirm a status of the search engine;
    a display unit configured to display, when the confirmation unit confirms that the search engine does not function for the at least one of the one or the plurality of search conditions set in the search folder, information indicating a malfunction; and
    a communication unit configured to communicate with another apparatus having a search function,
    wherein (i) when the confirmation unit confirms that the search engine does not function for the at least one of the one or the plurality of search conditions set in a first search folder, upon making a list display of folders including the first search folder and folders other than the first search folder, the display unit displays, together with the list display of folders, information indicating that the search engine does not function for the at least one of the one or the plurality of search conditions set in the first search folder on an icon of the first search folder, and (ii) when the confirmation unit confirms that the search engine functions for all search conditions set in a second search folder, the display unit does not display information indicating a malfunction on an icon of the second search folder, and
    wherein the confirmation unit confirms a status of a search engine of the another apparatus using the communication unit when the one or the plurality of search conditions set in the search folder include a condition indicating that the search is to be conducted using a search function of the another apparatus.

2. An information processing apparatus comprising one or more processors configured to function as:
    a search engine configured to search for a file contained in a search folder, wherein one or a plurality of search conditions are set in the search folder, and wherein at least one of the one or the plurality of search conditions specifies whether or not searching for text described in the file is functioning;
    a confirmation unit configured to confirm a status of the search engine;
    a display unit configured to display, when the confirmation unit confirms that the search engine does not function for the at least one of the one or the plurality of search conditions set in the search folder, information indicating a malfunction; and
    a communication unit configured to communicate with another apparatus having a search function,
    wherein (i) when the confirmation unit confirms that the search engine does not function for the at least one of the one or the plurality of search conditions set in a first search folder, upon displaying the file of the first search folder, the display unit displays, together with the display of the file, information indicating that the search engine does not function for the at least one of the one or the plurality of search conditions set in the first search folder, and (ii) when the confirmation unit confirms that the search engine functions for all search conditions set in a second search folder, the display unit does not display information indicating a malfunction with the display of the file in the second search folder, and
    wherein the confirmation unit confirms a status of a search engine of the another apparatus using the communication unit when the one or the plurality of search conditions set in the search folder include a condition indicating that the search is to be conducted using a search function of the another apparatus.

3. The apparatus according to claim 1, wherein the display unit displays a status for each search condition by the search engine.

4. The apparatus according to claim 1, wherein when the confirmation unit confirms that the search engine does not function for the at least one of the one or the plurality of search conditions set in the first search folder, the display unit displays a recovery method of a search corresponding to the at least one of the one or the plurality of search conditions for which the search engine does not function.

5. A method for an information processing apparatus, the method comprising:
    searching, by one or more processors, for a file contained in a search folder, wherein one or a plurality of search conditions are set in the search folder, and wherein at least one of the one or the plurality of search conditions specifies whether or not searching for text described in the file is functioning;
    confirming, by the one or more processors, a status of the search for the search folder;
    displaying, by the one or more processors, when it is confirmed that the search does not function for the at least one of the one or the plurality of search conditions set in the search folder, information indicating a malfunction; and
    communicating, by the one or more processors, with another apparatus having a search function,
    wherein (i) when it is confirmed that the search does not function for the at least one of the one or the plurality of search conditions set in a first search folder, upon making a list display of folders including the first search folder and folders other than the first search folder, information indicating that the search does not function for the at least one of the one or the plurality of search conditions set in the first search folder is displayed on an icon of the first search folder together with the list display of folders, and (ii) when it is confirmed that the search functions for all search conditions set in a second search folder, information indicating a malfunction on an icon of the second search folder is not displayed, and wherein a status of a search engine of the another apparatus is confirmed when the one or the plurality of search conditions set in the search folder include a condition indicating that the search is to be conducted using a search function of the another apparatus.

6. A method for an information processing apparatus, the method comprising:

searching, by one or more processors, for a file contained in a search folder, wherein one or a plurality of search conditions are set in the search folder, and wherein at least one of the one or the plurality of search conditions specifies whether or not searching for text described in the file is functioning;

confirming, by the one or more processors, a status of the search for the file;

displaying, by the one or more processors, when it is confirmed that the search does not function for the at least one of the one or the plurality of search conditions set in the search folder, information indicating a malfunction; and communicating, by the one or more processors, with another apparatus having a search function, wherein (i) when it is confirmed that the search does not function for the at least one of the one or the plurality of search conditions set in a first search folder, upon displaying the file of the first search folder, information indicating that the search does not function for the at least one of the one or the plurality of search conditions set in the first search folder is displayed together with the display of the file, and (ii) when it is confirmed that the search functions for all search conditions set in a second search folder, information indicating a malfunction with the display of the file in the second search folder is not displayed, and wherein a status of a search engine of the another apparatus is confirmed when the one or the plurality of search conditions set in the search folder include a condition indicating that the search is to be conducted using a search function of the another apparatus.

7. A non-transitory computer-readable recording medium containing computer-executable instructions for controlling an information processing apparatus, the non-transitory computer-readable recording medium comprising:

computer-executable instructions for searching for a file contained in a search folder, wherein one or a plurality of search conditions are set in the search folder, and wherein at least one of the one or the plurality of search conditions specifies whether or not searching for text described in the file is functioning;

computer-executable instructions for confirming a status of the search for the file; and computer-executable instructions for displaying, when it is confirmed that the search does not function for the at least one of the one or the plurality of search conditions set in the search folder, information indicating a malfunction; and computer-executable instructions for communicating with another apparatus having a search function, wherein (i) when it is confirmed that the search does not function for the at least one of the one or the plurality of search conditions set in a first search folder, upon making a list display of folders including the first search folder and folders other than the first search folder, information indicating that the search does not function for the at least one of the one or the plurality of search conditions set in the first search folder is displayed on an icon of the first search folder together with the list display of folders, and (ii) when it is confirmed that the search functions for all search conditions set in a second search folder, information indicating a malfunction on an icon of the second search folder is not displayed, and wherein a status of a search engine of the another apparatus is confirmed when the one or the plurality of search conditions set in the search folder includes a condition indicating that the search is to be conducted using a search function of the another apparatus.

8. A non-transitory computer-readable recording medium containing computer-executable instructions for controlling an information processing apparatus, the non-transitory computer-readable recording medium comprising:

computer-executable instructions for searching for a file contained in a search folder, wherein one or a plurality of search conditions are set in the search folder, and wherein at least one of the one or the plurality of search conditions specifies whether or not searching for text described in the file is functioning;

computer-executable instructions for confirming a status of the search for the file;

computer-executable instructions for displaying, when it is confirmed that the search does not function for the at least one of the one or the plurality of search conditions set in the search folder, information indicating a malfunction; and computer-executable instructions for communicating with another apparatus having a search function, wherein (i) when it is confirmed that the search does not function for the at least one of the one or the plurality of search conditions set in a first search folder, upon displaying the file of the first search folder, information is displayed indicating that the search does not function for the at least one of the one or the plurality of search conditions set in the first search folder is displayed together with the display of the file, and (ii) when it is confirmed that the search functions for all search conditions set in a second search folder, information indicating a malfunction with the display of the second search folder is not displayed, and wherein, during communication with the another apparatus, a status of a search engine of the another apparatus is confirmed when the one or the plurality of search conditions set in the search folder includes a condition indicating that the search is to be conducted using a search function of the another apparatus.

9. The apparatus according to claim 1, wherein the display unit is further configured to display the search folder so as to be identifiable from a folder that is not the search folder, and wherein the display unit visually marks on the search folder indicating that the search engine does not function for the at least one of the one or the plurality of search conditions set in the search folder.

10. The apparatus according to claim 1, wherein, upon making a list display of folders including the first and second search folders, the display unit is further configured to display the first search folder that the search engine does not function for the at least one of the one or the plurality of search conditions set in the first search folder so as to be identifiable from the second search folder that the search engine functions for the one or the plurality of search conditions set in the second search folder.

11. The apparatus according to claim 1, wherein the plurality of search conditions further includes a second search condition that is set in the search folder and that specifies whether or not another type of search is functioning.

12. The apparatus according to claim 11, wherein, when the confirmation unit confirms that the search engine does not function for the at least one of the plurality of search conditions set in the search folder and the search engine functions for the second search condition, the display unit is configured to display information indicating a malfunction.

13. The apparatus according to claim 11, wherein the another type of search is searching for attributes of the file.

* * * * *